US012200653B2

(12) United States Patent
Wu et al.

(10) Patent No.: US 12,200,653 B2
(45) Date of Patent: Jan. 14, 2025

(54) COMMUNICATION METHOD, COMMUNICATION APPARATUS, AND COMMUNICATION SYSTEM

(71) Applicant: HUAWEI TECHNOLOGIES CO., LTD., Guangdong (CN)

(72) Inventors: Yedan Wu, Shanghai (CN); Tingting Geng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 351 days.

(21) Appl. No.: 17/831,289

(22) Filed: Jun. 2, 2022

(65) Prior Publication Data
US 2022/0303937 A1    Sep. 22, 2022

Related U.S. Application Data

(63) Continuation of application No. PCT/CN2019/123035, filed on Dec. 4, 2019.

(51) Int. Cl.
H04W 60/06 (2009.01)
H04W 8/20 (2009.01)

(52) U.S. Cl.
CPC ............. H04W 60/06 (2013.01); H04W 8/20 (2013.01)

(58) Field of Classification Search
CPC .................................. H04W 60/06; H04W 8/20
See application file for complete search history.

(56) References Cited

U.S. PATENT DOCUMENTS

| 8,665,862 | B1 | 3/2014 | Stegall |
| 2011/0244880 | A1 | 10/2011 | Chin et al. |
| 2018/0176976 | A1 | 6/2018 | Liu |
| 2018/0359662 | A1* | 12/2018 | Kim .................... H04W 48/02 |

FOREIGN PATENT DOCUMENTS

| CN | 103024871 A | 4/2013 |
| CN | 104159329 A | 11/2014 |
| CN | 109451577 A | 3/2019 |
| CN | 109587742 A | 4/2019 |
| CN | 110300461 A | 10/2019 |

(Continued)

OTHER PUBLICATIONS

Extended European Search Report in European Appln No. 19955226.6, dated Nov. 7, 2022, 12 pages.

(Continued)

Primary Examiner — Diane D Mizrahi
(74) Attorney, Agent, or Firm — Fish & Richardson P.C.

(57) ABSTRACT

This disclosure provides communication methods, communication apparatuses, and communication systems. One example method includes: A terminal device supporting a first subscriber identity and a second subscriber identity determines to deregister the first subscriber identity from a first network. Then, the terminal device sends a deregistration request message to an access network device by using the second subscriber identity, where the deregistration request message is used to request to deregister the first subscriber identity form the first network, and the deregistration request message carries an identifier of the first subscriber identity.

14 Claims, 8 Drawing Sheets

(56) References Cited

FOREIGN PATENT DOCUMENTS

CN 110351891 A 10/2019

OTHER PUBLICATIONS

3GPP TS 23.501 V15.6.0 (Jun. 2019), "3rd Generation Partnership Project; Technical Specification Group Services and System Aspects; System Architecture for the 5G System; Stage 2 (Release 15)," Jun. 2019, 243 pages.
PCT International Search Report and Written Opinion issued in International Application No. PCT/CN2019/123035 on Apr. 26, 2020, 16 pages (with English translation).

* cited by examiner

COMMUNICATION METHOD, COMMUNICATION APPARATUS, AND COMMUNICATION SYSTEM

CROSS-REFERENCE TO RELATED APPLICATIONS

This application is a continuation of International Application No. PCT/CN2019/123035, filed on Dec. 4, 2019, the disclosure of which is hereby incorporated by reference in its entirety.

TECHNICAL FIELD

This application relates to the field of wireless communication technologies, and in particular, to a communication method, communication apparatus, and communication system.

BACKGROUND

In recent years, to meet use requirements of different users, a terminal device that supports access to a plurality of different networks emerges. For example, a terminal device not only can access a public land mobile network (PLMN), but also can access a stand-alone non-public network (SNPN). In this case, a switch (which, for example, may be similar to a Wi-Fi switch) of a stand-alone non-public access mode (SNPN access mode) may be set on the terminal device, and a user may choose whether to enable the stand-alone non-public access mode by turning on or turning off the switch, to select a network to access. For example, when a user turns on the switch, the user can select only the stand-alone non-public network to access, but cannot select a public network to access. Accordingly, when the user turns off the switch, the user can only select the public network to access, but cannot select the stand-alone non-public network to access.

On this basis, once a status of the stand-alone non-public access mode changes, the terminal device performs network selection again between the public network and the stand-alone non-public network regardless of whether the stand-alone non-public access mode is enabled or disabled. When a target network is selected, if the terminal device is in an idle mode or an inactive mode in an original network, the terminal device directly leaves the original network and enters the target network.

In this way, an original network side does not know that the terminal device has left, and from the perspective of the original network, the terminal device is still a terminal device in the idle mode in the original network. In this case, if the original network side needs to send data to the terminal device, the original network side searches after the terminal device by using a paging message. However, because the terminal device has gone to another network, the terminal device cannot receive the paging message, and a base station in the original network side keeps paging the terminal device. Consequently, a large quantity of air interface resources are wasted, and electric energy of the base station is also wasted.

SUMMARY

This application provides a communication method, communication apparatus, and communication system, to avoid ineffective paging on an original network side, and save air interface resources and electric energy that is of an access network device.

According to a first aspect, a communication method is provided. The method may be performed by a terminal device, or may be performed by a chip or a circuit disposed in the terminal device. This is not limited in this application.

Specifically, the method includes: A terminal device camping on a first network in a radio resource control (RRC) idle mode or an RRC inactive mode determines that the terminal device needs to enter a second network through network selection; the terminal device enters an RRC connected mode; and the terminal device initiates a deregistration procedure to the first network.

The terminal device in this application can access the first network, and can also access the second network. To be specific, the terminal device in this application has a capability of accessing a plurality of different networks, and may perform network selection between the first network and the second network.

When the terminal device determines that the terminal device needs to leave the first network and enter the second network through network selection, if the terminal device currently camps on the first network in the RRC idle mode or the RRC inactive mode, the terminal device first enters the RRC connected mode, initiates the deregistration procedure to the first network, and leaves the first network only after the deregistration procedure is completed.

In this embodiment of this application, that the terminal device initiates the deregistration procedure to the first network means that the terminal device deregisters from the first network, so that the terminal device is in a deregistration state in the first network. After the deregistration procedure is completed, almost all contexts (except a small part of information used to facilitate authentication) of the terminal device in the first network disappear, and the first network learns that the terminal device has left the network. When data of the terminal device arrives on a first network side, the terminal device is not paged. In some cases, deregistration in this application may also be understood as detachment.

According to this embodiment of this application, before leaving the first network, the terminal device in the RRC idle mode or the RRC inactive mode first enters the RRC connected mode, and deregisters from the first network through the deregistration procedure, to notify the first network that the terminal device is about to leave. Through the foregoing setting, ineffective paging of the terminal device by the first network can be avoided, and air interface resources and electric energy that is of the access network device can be saved.

Optionally, in addition to being capable of accessing the first network and the second network, the terminal device may further have a capability of accessing another network. This is not limited in this application.

Optionally, the first network may be a public network, the second network may be a stand-alone non-public network, and the terminal device may determine, based on a status change of a stand-alone non-public network access mode, that the terminal device needs to enter the second network through network selection.

Optionally, the network selection may be automatic network selection, or may be manual network selection by a user. This is not limited in this application.

In this embodiment of this application, the first network and the second network are two different networks, and the first network and the second network may be of a same type or different types. This is not limited in this application. For example, the first network may be any one of the public network, the stand-alone non-public network, a non-stand-alone non-public network, a non-terrestrial network, and the like, and the second network may also be any one of the public network, the stand-alone non-public network, the non-stand-alone non-public network, the non-terrestrial network, and the like.

Standards of the first network and the second network may be the same, or may be different. This is not limited in this application.

Optionally, mobility may be supported between the first network and the second network. That mobility is supported is described below by using an example.

Optionally, that mobility is supported between the first network and the second network may mean that the terminal device can perform cell handover and cell reselection between the first network and the second network.

Optionally, that mobility is supported between the first network and the second network may mean that the first network and the second network share a same core network device (for example, share a same access and mobility management function (AMF) entity, and the AMF is used as an example for description below).

Optionally, that mobility is supported between the first network and the second network may mean that control plane signaling interworking can be performed between an AMF of the first network and an AMF of the second network.

For example, the first network may be the public network, and the second network may be the non-stand-alone non-public network depending on the public network. Alternatively, the first network may be the non-stand-alone non-public network, and the second network may be the public network on which the non-stand-alone non-public network depends.

For another example, the first network and the second network may be two non-stand-alone non-public networks depending on a same public network.

In this embodiment of this application, optionally, mobility may not be supported between the first network and the second network. That mobility is not supported is described below by using an example.

Optionally, that mobility is not supported between the first network and the second network may mean that the terminal device cannot perform cell handover and cell reselection between the first network and the second network.

Optionally, that mobility is not supported between the first network and the second network may mean that the first network and the second network use respective AMFs, and control plane signaling interworking cannot be performed between the AMFs.

For example, the first network may be the stand-alone non-public network, and the second network may be any one of the public network, the non-stand-alone non-public network, the non-terrestrial network, and another stand-alone non-public network.

For another example, the first network may be any one of the public network, the non-stand-alone non-public network, the non-terrestrial network, and the stand-alone non-public network, and the second network may be another stand-alone non-public network.

Mobility is not supported between the first network and the second network, and consequently a core network device in the first network and a core network device in the second network cannot exchange context information of the terminal device. To be specific, the core network device cannot actively initiate the deregistration procedure of the terminal device. Therefore, the method provided in this embodiment of this application is more meaningful.

With reference to the first aspect, in some implementations of the first aspect, that the terminal device enters the RRC connected mode includes: The terminal device is connected to a first cell, where the first cell is a cell of the first network on which the terminal device currently camps, or the first cell is another cell of the first network.

According to a second aspect, a communication method is provided. The method may be performed by a terminal device, or may be performed by a chip or a circuit disposed in the terminal device. This is not limited in this application.

Specifically, the method includes: The terminal device determines that a first subscriber identity needs to be deregistered from a first network, where the terminal device supports the first subscriber identity and a second subscriber identity; and the terminal device sends a deregistration request message to an access network device by using the second subscriber identity, where the deregistration request message carries an identifier of the first subscriber identity, and the deregistration request message is used to request to deregister the first subscriber identity from the first network.

According to the communication method provided in this application, when the first subscriber identity in the terminal device needs to be deregistered from the first network, the deregistration request message for the first subscriber identity may be sent to the access network device by using the second subscriber identity, to initiate a deregistration procedure of the first subscriber identity to the first network, and notify the first network that the first subscriber identity is about to leave. Through the foregoing setting, ineffective paging to the first subscriber identity by the first network can be avoided, thereby saving air interface resources and electric energy that is of the access network device.

Optionally, the first network may be any one of a public network, a non-stand-alone non-public network, a non-terrestrial network, and a stand-alone non-public network.

The access network device provides a service for the second subscriber identity, that is, the access network device is an access network device to which a serving cell of the second subscriber identity belongs.

Optionally, before the terminal device sends the deregistration request message to the access network device by using the second subscriber identity, the second subscriber identity may be in an idle mode, an inactive mode, or a connected mode. This is not limited in this application.

For example, the second subscriber identity may be in the idle mode. In this case, the second subscriber identity needs to first establish an RRC connection to the access network device.

For another example, the second subscriber identity may be in the inactive mode. In this case, the second subscriber identity needs to first resume the RRC connection to the access network device.

With reference to the second aspect, in some implementations of the second aspect, the access network device belongs to the first network, or the access network device belongs to a third network, and mobility is supported between the third network and the first network.

Optionally, the access network device may belong to the first network, that is, the second subscriber identity is a user in the first network. In other words, the first subscriber identity and the second subscriber identity may belong to users in a same network. For example, the first subscriber identity and the second subscriber identity belong to a same operator.

Optionally, the access network device may also belong to the third network, that is, the second subscriber identity is a user in the third network. In other words, the first subscriber identity and the second subscriber identity may belong to users in different networks. In this case, mobility is supported between the third network and the first network, so that the deregistration procedure of the first subscriber identity may be initiated to the first network by using the third network. That mobility is supported between the third network and the first network is described in the following by using an example.

With reference to the second aspect, in some implementations of the second aspect, the deregistration request message further carries an identifier of the second subscriber identity, and the deregistration request message is further used to request to deregister the second subscriber identity. Through the foregoing setting, one deregistration request message can be used to request deregistration of a plurality of subscriber identities.

With reference to the second aspect, in some implementations of the second aspect, the method further includes: The terminal device receives, by using the second subscriber identity, a deregistration accept message sent by the access network device, where the deregistration accept message carries the identifier of the first subscriber identity. Through the foregoing setting, the terminal device can determine that a deregistration application for a first user is accepted by a network side.

With reference to the second aspect, in some implementations of the second aspect, that the terminal device determines that a first subscriber identity needs to be deregistered from a first network includes: The terminal device determines that the first subscriber identity camping on the first network needs to enter a second network through network selection.

According to a third aspect, a communication method is provided. The method may be performed by an access network device, or may be performed by a chip or a circuit disposed in the access network device. This is not limited in this application.

Specifically, the method includes: The access network device receives a deregistration request message sent by a terminal device by using a second subscriber identity, where the deregistration request message carries an identifier of a first subscriber identity, and the deregistration request message is used to request to deregister the first subscriber identity from the first network; and the access network device sends the deregistration request message to a core network device.

With reference to the third aspect, in some implementations of the third aspect, the access network device belongs to the first network, or the access network device belongs to a third network, and mobility is supported between the third network and the first network.

With reference to the third aspect, in some implementations of the third aspect, the deregistration request message further carries an identifier of the second subscriber identity, and the deregistration request message is further used to request to deregister the second subscriber identity.

With reference to the third aspect, in some implementations of the third aspect, the method further includes: The access network device sends a deregistration accept message to the second subscriber identity in the terminal device, where the deregistration accept message carries the identifier of the first subscriber identity.

According to a fourth aspect, a communication apparatus is provided. The apparatus includes a processing unit and a transceiver unit. The processing unit is configured to determine that the communication apparatus that camps on a first network in a radio resource control (RRC) idle mode or an RRC inactive mode needs to enter a second network through network selection. The processing unit is further configured to control the communication apparatus to enter an RRC connected mode, and the processing unit is further configured to initiate a deregistration procedure to the first network by using the transceiver unit.

With reference to the fourth aspect, in some implementations of the fourth aspect, the processing unit is further configured to control the communication apparatus to connect to a first cell, where the first cell is a cell of the first network on which the communication apparatus currently camps, or the first cell is another cell of the first network.

According to a fifth aspect, a communication apparatus is provided. The apparatus includes: a processing unit, configured to determine that a first subscriber identity needs to be deregistered from a first network, where the communication apparatus supports the first subscriber identity and a second subscriber identity; and a transceiver unit, configured to send a deregistration request message to an access network device as the second subscriber identity, where the deregistration request message carries an identifier of the first subscriber identity, and the deregistration request message is used to request to deregister the first subscriber identity from the first network.

With reference to the fifth aspect, in some implementations of the fifth aspect, the access network device belongs to the first network, or the access network device belongs to a third network, and mobility is supported between the third network and the first network.

With reference to the fifth aspect, in some implementations of the fifth aspect, the deregistration request message further carries an identifier of the second subscriber identity, and the deregistration request message is further used to request to deregister the second subscriber identity.

With reference to the fifth aspect, in some implementations of the fifth aspect, the transceiver unit is further configured to receive, by using the second subscriber identity, a deregistration accept message sent by the access network device, where the deregistration accept message carries the identifier of the first subscriber identity.

With reference to the fifth aspect, in some implementations of the fifth aspect, the processing unit is further configured to determine that the first subscriber identity camping on the first network needs to enter a second network through network selection.

According to a sixth aspect, a communication apparatus is provided, including: a receiving unit, configured to receive a deregistration request message sent by a terminal device by using a second subscriber identity, where the deregistration request message carries an identifier of a first subscriber identity, and the deregistration request message is used to request to deregister the first subscriber identity from a first network; and a sending unit, configured to send the deregistration request message to a core network device.

With reference to the sixth aspect, in some implementations of the sixth aspect, the communication apparatus belongs to the first network, or the communication apparatus belongs to a third network, and mobility is supported between the third network and the first network.

With reference to the sixth aspect, in some implementations of the sixth aspect, the deregistration request message further carries an identifier of the second subscriber identity, and the deregistration request message is further used to request to deregister the second subscriber identity.

With reference to the sixth aspect, in some implementations of the sixth aspect, the sending unit is further configured to send a deregistration accept message to the second subscriber identity of the terminal device, where the deregistration accept message carries the identifier of the first subscriber identity.

According to a seventh aspect, a communication apparatus is provided. The apparatus may be a terminal device, or may be a chip in the terminal device. The apparatus may include a processing unit and a transceiver unit. When the apparatus is the terminal device, the processing unit may be a processor, and the transceiver unit may be a transceiver. The terminal device may alternatively include a storage unit, and the storage unit may be a memory. The storage unit is configured to store instructions, and the processing unit executes the instructions stored in the storage unit, to enable the terminal device to perform the method in the first aspect, or the second aspect. When the apparatus is the chip in the terminal device, the processing unit may be a processor, and the transceiver unit may be an input/output interface, a pin, a circuit, or the like. The processing unit executes instructions stored in a storage unit, so that the terminal device performs the method in the first aspect or the second aspect. The storage unit may be a storage unit (for example, a register or a cache) in the chip, or may be a storage unit (for example, a read-only memory or a random access memory) that is in the terminal device and that is outside the chip.

According to an eighth aspect, a communication apparatus is provided. The apparatus may be an access network device, or may be a chip in the access network device. The apparatus may include a processing unit and a transceiver unit. When the apparatus is the access network device, the processing unit may be a processor, and the transceiver unit may be a transceiver. The access network device may alternatively include a storage unit, and the storage unit may be a memory. The storage unit is configured to store instructions. The processing unit executes the instructions stored in the storage unit, to enable the access network device to perform the method in the third aspect. When the apparatus is a chip in the access network device, the processing unit may be a processor, and the transceiver unit may be an input/output interface, a pin, a circuit, or the like. The processing unit executes the instructions stored in the storage unit, so that the access network device performs the method in the third aspect. The storage unit may be a storage unit (for example, a register or a cache) in the chip, or may be a storage unit (for example, a read-only memory or a random access memory) that is in the access network device and that is outside the chip.

According to a ninth aspect, a communication apparatus is provided, including at least one processor. The at least one processor is configured to be coupled to a memory, read and execute instructions in the memory, to implement the method in any method in the first aspect, the second aspect, or the third aspect.

Optionally, the communication apparatus further includes the memory.

According to a tenth aspect, a computer program product is provided, where the computer program product includes computer program code, and when the computer program code is run on a computer, the computer is enabled to perform the method in the first aspect, the second aspect, or the third aspect.

It should be noted that the foregoing computer program code may be completely or partially stored in a first storage medium, where the first storage medium may be packaged with a processor or packaged separately from the processor. This is not specifically limited in this application.

According to an eleventh aspect, a computer-readable medium is provided, where the computer-readable medium stores program code, and when the computer program code is run on a computer, the computer is enabled to perform the method in the first aspect, the second aspect, or the third aspect.

According to a twelfth aspect, a chip system is provided, including a processor, and the processor is configured to invoke a computer program from a memory and run the computer program, so that a communication device on which the chip system is installed performs the method in the first aspect, the second aspect, or the third aspect.

According to a thirteenth aspect, a communication system is provided, where the communication system includes at least one of the communication apparatus provided in the fourth aspect, the communication apparatus provided in the fifth aspect, and the communication apparatus provided in the sixth aspect.

DESCRIPTION OF EMBODIMENTS

The following describes technical solutions of this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a 5th generation (5G) communication system, a new radio (NR) system, or a future evolved new wireless communication system.

Figure 1:
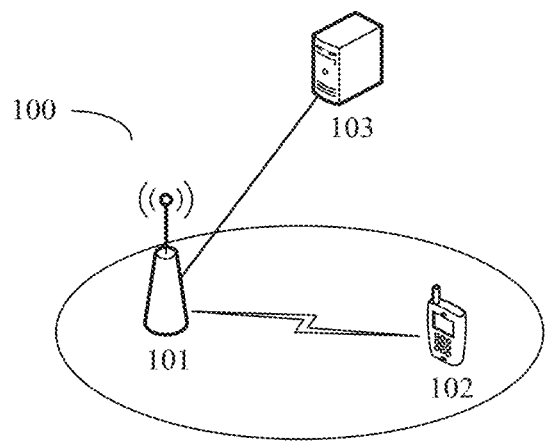
FIG. 1 is a schematic diagram of a communication system according to an embodiment of this application.

For ease of understanding embodiments of this application, a communication system shown in FIG. 1 is first used as an example to describe in detail a communication system applicable to embodiments of this application. FIG. 1 is a schematic diagram of a communication system 100 according to an embodiment of this application. As shown in FIG. 1, the communication system 100 may include at least one access network device (for example, an access network device 101 shown in FIG. 1) and at least one terminal device (for example, a terminal device 102 shown in FIG. 1). The access network device 101 may perform wireless communication with the terminal device 102. Optionally, the communication system 100 may further include more access network devices and/or more terminal devices. This is not limited in this application.

Further, as shown in FIG. 1, the communication system 100 provided in this application further includes at least one core network device (for example, the core network device 103 shown in FIG. 1). The core network device 103 may be in communication connection with (for example, in wired connection with) the access network device 101. Optionally, the communication system 100 may further include more core network devices. This is not limited in this application.

The access network device may include a device that communicates with a wireless terminal over an air interface in an access network by using one or more sectors. An access network system may be configured to perform conversion between a received over-the-air frame and an internet protocol (IP) packet, and serve as a router between the wireless terminal and a rest part of the access network. The rest part of the access network may include an IP network. A radio access network system may further coordinate attribute management for the air interface. It should be understood that the access network device includes but is not limited to: an evolved NodeB (eNB), a radio network controller (RNC), a NodeB (NB), a base station controller (BSC), a base transceiver station (BTS), a home evolved NodeB (for example, Home evolved NodeB, or Home NodeB, HNB), a baseband unit (BBU), an access point (AP) in a wireless fidelity (Wi-Fi) system, a wireless relay node, a wireless backhaul node, a transmission and reception point (TRP, or transmission point, TP), or the like. The access network device may be a gNB or a transmission and reception point (TRP or TP) in a 5G system such as an NR system, or one or more groups (including a plurality of antenna panels) of antenna panels of a base station in a 5G system; or may be a network node constructing a gNB or a transmission and reception point, for example, a baseband unit (BBU) or a distributed unit (DU).

In some deployment, the gNB may include a centralized unit (CU) and the DU. The gNB may further include a radio unit (RU). The CU implements a part of functions of the gNB, and the DU implements a part of the functions of the gNB. For example, the CU implements functions of a radio resource control (RRC) layer and a packet data convergence protocol (PDCP) layer. The DU implements functions of a radio link control (RLC) layer, a media access control (MAC) layer, and a physical (PHY) layer. Information at the RRC layer eventually becomes information at the PHY layer, or is converted from information at the PHY layer. Therefore, in this architecture, higher layer signaling such as RRC layer signaling may also be considered as being sent by the DU or by the DU and the CU. It may be understood that the access network device may be a CU node, a DU node, or a device including the CU node and the DU node. In addition, the CU may be classified into an access network device in the access network (radio access network, RAN), or the CU may be classified into an access network device in a core network (CN). This is not limited herein.

The terminal device may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device in embodiments of this application may be a mobile phone, a tablet computer (Pad), a computer with a wireless transceiver function, a virtual reality (VR) terminal device, an augmented reality (AR) terminal device, a wireless terminal in industrial control, a wireless terminal in self-driving (self-driving), a wireless terminal in telemedicine (remote medical), a wireless terminal in a smart grid, a wireless terminal in transportation safety, a wireless terminal in a smart city, a wireless terminal in a smart home, or the like. Application scenarios are not limited in embodiments of this application.

The core network device is a device in a core network (CN) that provides service support for the terminal device. The core network device in embodiments of this application may be configured to implement functions such as call connection, charging, mobility management, and a supplementary service. In the 5G system, the core network device may include, for example, an access and mobility management function (AMF) entity, a session management function (SMF) entity, a user plane function (UPF) entity, a policy control function (PCF) entity, and a unified data management (UDM) entity. Embodiments of this application mainly relate to communication with the AMF entity. Therefore, brief descriptions of the AMF entity are provided herein. The AMF entity may also be referred to as an AMF for short, is mainly used for mobility management, access management, and the like, and may be configured to implement other functions, other than session management, in mobility management entity (MME) functions, for example, a lawful interception function and an access authorization (or authentication) function. The following uses the AMF in 5G as an example of a network element used for mobility and access management, and shall not constitute any limitation on this application. This application does not exclude a possibility of replacing the AMF with another network element to implement same or similar functions. It should be noted that the entity in embodiments of this application may also be referred to as a network element or a functional entity. For example, the AMF entity may also be referred to as an AMF network element or an AMF functional entity.

For ease of understanding embodiments of this application, some technical concepts and communication procedures that may be used in embodiments of this application are first described by using examples.

1. Public Network

Generally, the public network provides a network service for the terminal device. The public network is a public land mobile network (PLMN) established and operated by a government or an operator approved by the government, to provide land mobile communication services for the public. The network is usually connected to a public switched telephone network (PSTN) to form a regional or national communication network.

Different PLMN identifications (IDs) may be used to distinguish between different PLMN networks. A PLMN identification includes a mobile country code (MCC) and a mobile network code (mobile net code, MNC). The MCC uniquely identifies a country to which a mobile subscriber belongs. For example, the MCC of China is 460. The MNC uniquely identifies a network in the country. For example, the MNC of China Mobile is 00, and the MNC of China Unicom is 01.

2. Non-Public Network

In addition to the public network, operators or private users also set up some non-public networks (NPNs) to meet user requirements. The non-public network may also be referred to as the non-public network, and is a network that is open to a specific user, for example, an internal network established by a company, a school, or a factory. A terminal device that does not subscribe to the non-public network is not allowed to access the non-public network. Non-public networks are classified into a non-stand-alone non-public networks and a stand-alone non-public network.

(1) Non-Stand-Alone Non-Public Network

A network resource (for example, the access network device, the core network device, or a spectrum resource) used by the non-stand-alone non-public network (NSA-NPN, or public network integrated non-public network, PNI-NPN) is a part of the public network. Alternatively, it may be considered that the non-stand-alone non-public network relies on the public network, or the non-stand-alone non-public network is based on the public network. The non-stand-alone non-public network is also referred to as a closed access group (CAG). An identifier of the non-stand-alone non-public network includes two parts: a PLMN ID and a CAG ID, where the PLMN ID of the non-stand-alone non-public network is consistent with the public network on which the non-stand-alone non-public network relies.

According to a current communication protocol, because the non-stand-alone non-public network uses a public network resource, mobility is supported between the non-stand-alone non-public network and the public network on which the non-stand-alone non-public network relies. In other words, some terminal devices may perform handover and/or cell reselection between the non-stand-alone non-public network and the public network. The handover means that under control of a base station, a terminal device in a connected mode is disconnected from a current serving cell, and is connected to a target cell. The cell reselection means that after a terminal device in an idle mode/in an inactive mode camps on a cell, as the terminal device moves, the terminal device may need to change to camp on another cell with a higher priority or a better signal. This is a cell reselection process.

(2) Stand-Alone Non-Public Network

The stand-alone non-public network (SNPN) is a non-public network that may not rely on a network function of the public network. Similarly, an identifier of the stand-alone non-public network is also divided into two parts: the PLMN ID and an network identifier (NID).

The stand-alone non-public network has an independent access network (radio access network, RAN) or/and a core network (CN). Therefore, mobility is usually not supported between the stand-alone non-public network and another network. For example, mobility is not supported between the stand-alone non-public network and the public network, the non-stand-alone non-public network, a non-terrestrial network (NTN), or another stand-alone non-public network. In other words, the stand-alone non-public network does not support the handover and the cell reselection of the terminal device between the stand-alone non-public network and the public network, the non-stand-alone non-public network, the non-terrestrial network, or another stand-alone non-public network. To be specific, the terminal device in the connected mode cannot be handed over from a stand-alone non-public network cell to a public network cell, a non-stand-alone non-public network cell, a non-terrestrial network cell, or another stand-alone non-public network cell, and vice versa. The terminal device in the idle mode/in the inactive mode cannot reselect from the stand-alone non-public network cell to the public network cell, the non-stand-alone non-public network cell, the non-terrestrial network cell, or the another stand-alone non-public network cell, and vice versa.

3. RRC Mode

Figure 2:
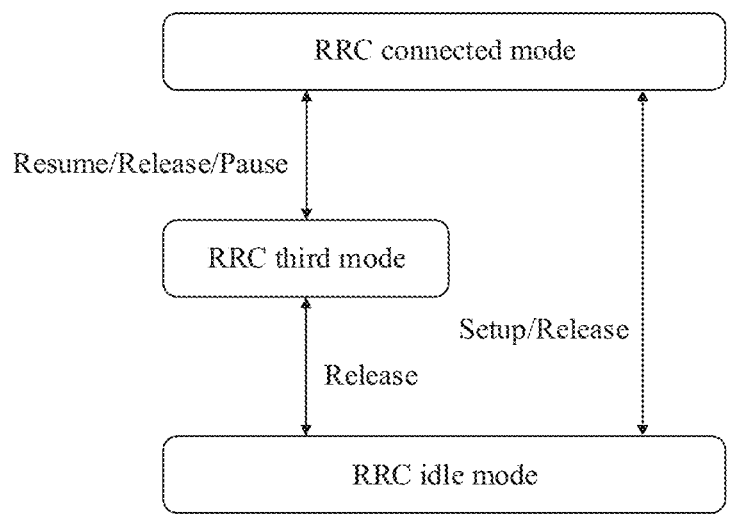
FIG. 2 is a schematic diagram of a switching relationship between three RRC modes according to an embodiment of this application.

In the 5G system, RRC modes of the terminal device include an RRC connected mode (RRC_CONNECTED), an RRC inactive mode or an RRC third mode (RRC_INACTIVE), and an RRC idle mode (RRC_IDLE). FIG. 2 is a schematic diagram of a switching relationship between three RRC modes according to an embodiment of this application.

When a terminal device is in an RRC connected mode, the terminal device has established links to both the base station and the core network, and when data arrives at a network, the data may be directly transmitted to the terminal device. When the terminal device is in a third RRC mode (or an RRC inactive mode), it indicates that the terminal device has previously established links to the base station and the core network, but a link from the terminal device to the base station is released. Although the link is released, the base station stores a context of the terminal device. When data needs to be transmitted, the base station may quickly resume the link. When the terminal device is in an RRC idle mode, there is no link between the terminal device and the base station or between the terminal device and the core network. When data needs to be transmitted, links between the terminal device and the base station and between the terminal device and the core network need to be established.

4. Paging

When the terminal device is in the idle mode or the inactive mode, a connection between the terminal device and the base station is disconnected. In this case, if a network side needs to send downlink data to the terminal device, the terminal device is found by using a paging message. After receiving the paging message and determining that the terminal device is paged, the terminal device establishes a connection to the base station for data transmission. Paging can be generally classified into CN paging and RAN paging. The following describes the two types of paging.

Core network paging is paging initiated by the core network device (for example, an AMF in a 5G system or an MME in an LTE system), and is mainly for the terminal device in the idle mode based on a tracking area (TA). When downlink data arrives at the core network device (that is, the network needs to send data to the terminal device), the core network device sends paging messages to all base stations included in a tracking area identity (TA identity, TAI) list of the terminal device, and then the base stations transparently transmit the paging messages to all terminal devices connected to related cells of the base stations. A terminal device that detects a paging message checks whether an identifier of the terminal device is included. If yes, the terminal device initiates an RRC setup request to connect to the network; or if no, the paging request is ignored.

Access network paging is mainly performed for a terminal device in an inactive mode based on a RAN-based notification area (RNA). The access network paging is initiated by a last serving base station before the terminal device enters the inactive mode from the connected mode. A core network device (for example, the AMF) side does not sense that the terminal device enters the inactive mode. For the core network device, the terminal device is still in the connected mode, and therefore continues to send data to the last serving base station. After failing to find the terminal device, the last serving base station sends paging messages to all base stations involved in an access network paging area (RAN paging area) in which the terminal device is located, and these base stations then transparently transmit the paging messages to all terminal devices connected to the base stations. A terminal device that detects a paging message checks whether the paging message includes an identifier of the terminal device. If yes, the terminal device initiates an RRC resume request to connect to the network; or if no, the paging request is ignored.

5. Random Access

In the 5G system, a random access process usually needs to be performed in the following several cases: The terminal device initially accesses a network and switches from an idle mode/an inactive mode to a connected mode; an RRC connection is re-established after a radio connection is interrupted; during a handover, the terminal device needs to establish uplink synchronization with a target cell; when the terminal device is in a connected mode but uplink synchronization is not performed on the terminal device, uplink data or downlink data arrives, and the uplink synchronization needs to be established through the random access; and when user positioning is performed based on uplink measurement; and when no dedicated scheduling resource is allocated on a physical uplink control channel (PUCCH), an uplink resource is applied for through random access.

Figure 3:
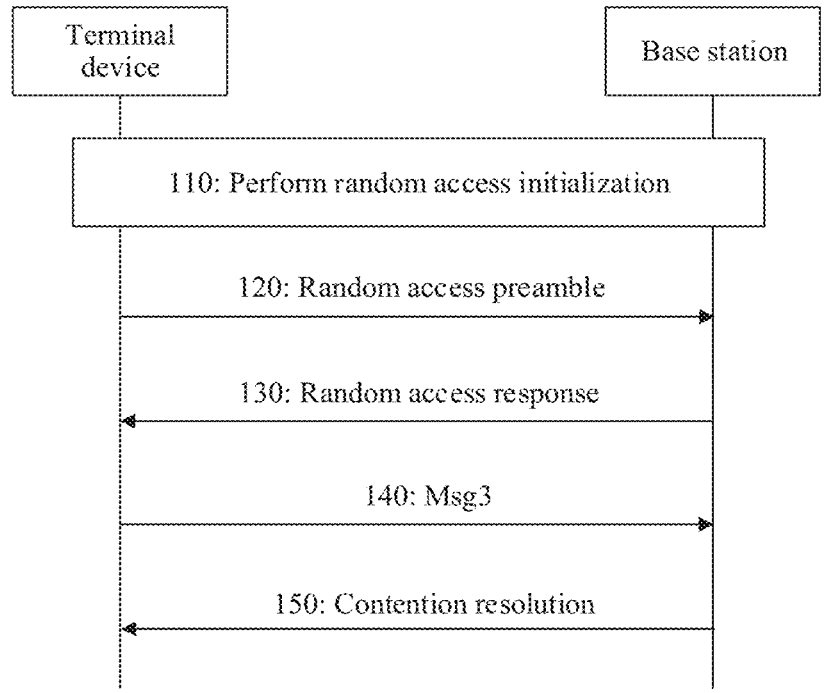
FIG. 3 is a flowchart of four-step contention-based random access according to an embodiment of this application.

Random access types include contention-based random access, non-contention-based random access, four-step random access, two-step random access, and the like. FIG. 3 is a flowchart of four-step contention-based random access.

110: Perform random access initialization.

120: A terminal device sends a random access preamble to a base station.

The random access preamble is carried in a first message (Msg1). A main function of the random access preamble is to notify the base station that there is a random access request, so that the base station can estimate a transmission latency between the base station and the terminal device, so that the base station can calibrate uplink advance (uplink timing) and notify the terminal device of calibration information by using a timing advance command.

130: The terminal device receives a random access response (RAR) sent by the base station.

The RAR is carried in a second message (Msg2). After sending the preamble, the terminal device listens to a corresponding physical downlink control channel (PDCCH) in an RAR response window based on a random access radio network temporary identifier (RA-RNTI) corresponding to the preamble. If a preamble carried in a response received by the terminal device is consistent with a preamble sent in the Msg1, the terminal device stops listening to the RAR.

The RAR includes an uplink timing advance, an uplink grant (UL grant) allocated to a third message (Msg3), a temporary cell radio network temporary identifier (temporary C-RNTI) allocated by a network side, and the like.

140: The terminal device sends a message (namely, Msg3) that is based on scheduled transmission to the base station.

The terminal device sends the Msg3 to the base station based on the uplink grant and uplink timing advance information in the Msg2. Herein, content of the Msg3 may alternatively be different based on different statuses of the terminal device and different application scenarios.

The Msg3 may be classified into the following types: an RRC connection request, a tracking area data update, a resource scheduling request, and the like.

150: The terminal device receives a contention resolution, namely, a fourth message Msg4, sent by the base station.

Contention occurs when a plurality of terminal devices use a same preamble to initiate random access. A maximum of one terminal device in terminal devices contending for a same resource can succeed in accessing. In this case, the base station sends a contention resolution message to the terminal device by using a physical downlink shared channel (PDSCH). If the terminal device receives the contention resolution message sent by the base station to the terminal device, it is considered that the random access process succeeds.

6. Deregistration Procedure

Figure 4:
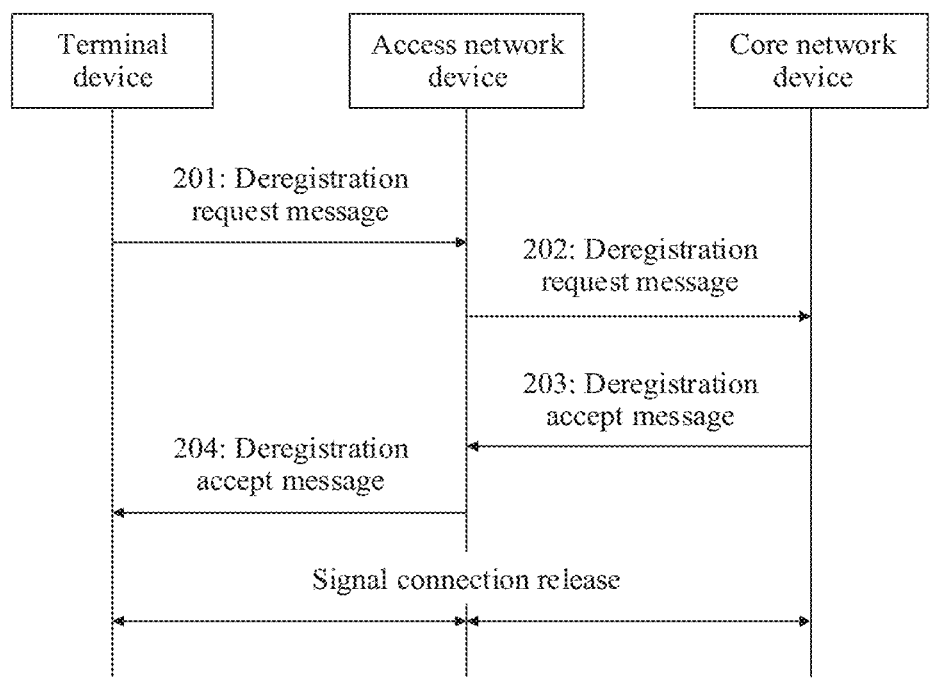
FIG. 4 is a schematic diagram of a deregistration procedure according to an embodiment of this application.

After registering with a network, a terminal device in a connected mode needs to be in a deregistration mode (that is, needs to leave the network) for some reasons, and needs to initiate a deregistration procedure (deregistration process). For example, before a mobile phone is powered off, the terminal device initiates a deregistration procedure, to notify a network side that the terminal device is not in the network. A similar process is referred to as a detach process in an LTE system. FIG. 4 is a schematic diagram of a deregistration procedure according to an embodiment of this application.

As shown in FIG. 4, in step 201, when a terminal device needs to be detached from a network, the terminal device initiates a deregistration procedure, sends a deregistration request message to an access network device (for example, a gNB), and includes an identifier of the terminal device in the deregistration request message. Optionally, the network may be any one of a public network, a stand-alone non-public network, a non-stand-alone non-public network, a non-terrestrial network, or the like.

In step 202, the access network device forwards the deregistration request message to a core network device. Optionally, the deregistration request message may be transmitted by using a non-access stratum (NAS), that is, the terminal device transparently transmits the deregistration request message to the core network device by using the access network device.

In step 203, after receiving the deregistration request message, and completing a related deregistration program (which may involve a plurality of pieces of signaling interworking with another core network device, and details are not described herein) on a core network side, the core network device sends a deregistration accept message to the access network device. Optionally, the core network device may be an AMF.

In step 204, the access network device forwards the deregistration accept message to the terminal device. After receiving the deregistration accept message, the terminal device performs signal connection release (signaling connection release) from a network side, to complete the deregistration procedure. In this case, the terminal device has almost no context (except a small part of information used to facilitate authentication) on a core network device side, and it may be simply considered that the terminal device does not exist in the network.

It should be understood that, in actual application, to reduce signaling overheads, the core network device or the access network device may alternatively not send the deregistration accept message. For example, when determining that the terminal device is deregistered because the terminal device is powered off, the core network device or the access network device may not send the deregistration accept message to the terminal device. That is, step 203 and step 204 are optional steps.

7. Network Selection

In recent years, to meet use requirements of different users, a terminal device that supports access to a plurality of different networks emerges. For example, a terminal device not only has a capability of accessing a public network, but also has a capability of accessing a stand-alone non-public network. In this case, a switch (which, for example, may be similar to a Wi-Fi switch) of a stand-alone non-public access mode (SNPN access mode) may be set on the terminal device, and a user may choose whether to enable the stand-alone non-public access mode by turning on or turning off the switch, to select a network to access. For example, when a user turns on the switch, the user can select only the stand-alone non-public network to access, but cannot select the public network to access. Accordingly, when the user turns off the switch, the user can select only the public network to access, but cannot select the stand-alone non-public network to access.

Specifically, when the stand-alone non-public network access mode is not enabled, the terminal device may access the public network, and camp on a public network cell when the terminal device is in an idle mode or an inactive mode. When the stand-alone non-public network access mode is enabled (for example, the user manually turns on the switch of the stand-alone non-public network access mode), the terminal device leaves the public network and starts to access the stand-alone non-public network. In this case, the terminal device may perform selection based on a network list broadcast by a stand-alone non-public network cell. A selection process is generally classified into two types, namely, automatic network selection and manual network selection. Herein, network selection may be a process in which the terminal device selects a network identifier. For example, a PLMN ID is selected in a PLMN and a CAG, and the PLMN ID and an NID are selected in an SNPN.

(1) Automatic Network Selection

In this mode, the terminal device selects a stand-alone non-public network with a subscription permanent identifier (SUPI), and a certificate and attempts to register with the stand-alone non-public network. That is, the terminal device selects a stand-alone non-public network that has been authenticated for registration. When a plurality of stand-alone non-public networks are available for registration, to be specific, the terminal device finds a plurality of authenticated stand-alone non-public networks, the terminal device selects a stand-alone non-public network for registration. The selection process is internal implementation of the terminal device, and is not described in detail herein.

(2) Manual Network Selection

In this mode, the terminal device provides a user with human-readable names (for example, a Huawei non-public network) of a network in a network list broadcast by the stand-alone non-public network cell. The user selects the stand-alone non-public network (where an operation may be selecting by clicking, which is similar to selecting a Wi-Fi network by the user), and the UE registers with a related stand-alone non-public network based on the selection of the user.

When the stand-alone non-public network access mode remains enabled, the terminal device also camps on the stand-alone non-public network cell when entering the idle mode or the inactive mode. When the stand-alone non-public network access mode is disabled, the terminal device leaves the stand-alone non-public network and starts to access the public network. In this case, the terminal device first selects a corresponding public network, and then performs cell selection. Specifically, the terminal device first selects, from a found public network list, a suitable network as a serving network of the terminal device, then searches for various cells in the network, and selects a suitable cell as a serving cell of the terminal device.

According to existing protocol progress, for a terminal device that supports a stand-alone non-public network function, once a status of the stand-alone non-public network access mode changes, regardless of whether the stand-alone non-public network access mode is enabled or disabled, the terminal device performs network reselection between the public network and the stand-alone non-public network. When a target network is selected, if the terminal device is in the idle mode or the inactive mode, because a connection between the terminal device and a base station has been released, and the terminal device and the base station cannot communicate with each other, the terminal device leaves an original network silently, and a base station and a core network device (for example, an AMF in a 5G system or an MME in LTE) in the original network are not notified. In this way, from a perspective of the original network, the terminal device is still the terminal device in the idle mode in the original network, and does not know that the terminal device has gone to another network.

Inconsistency between a status on a terminal side and a status on an original network side causes many problems. For example, the original network side still maintains a context of the terminal device. In this case, if the original network side has data to send to the terminal device, the original network side searches for the terminal device by using a paging message. However, because the terminal device has gone to another network, and the terminal device cannot receive the paging message, a base station on the original network side keeps paging the terminal device. Consequently, a large quantity of NG interface resources and air interface resources are wasted, and electric energy of the base station is also wasted.

Based on the foregoing problem, this application provides a communication method, a communication apparatus, and a communication system, to avoid ineffective paging on the original network side, and save air interface resources and electric energy that is of an access network device.

It should be understood that in embodiments of this application, the terminal device and/or the network device (for example, the access network device or the core network device) may perform some or all of the steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application are necessarily to be performed.

The following describes communication methods provided in embodiments of this application with reference to the accompanying drawings. The access network device in the embodiments may be the access network device 101 in FIG. 1, the terminal device in the embodiments may be the terminal device 102 in FIG. 1, and the core network device in the embodiments may be the core network device 103 in FIG. 1.

Figure 5:
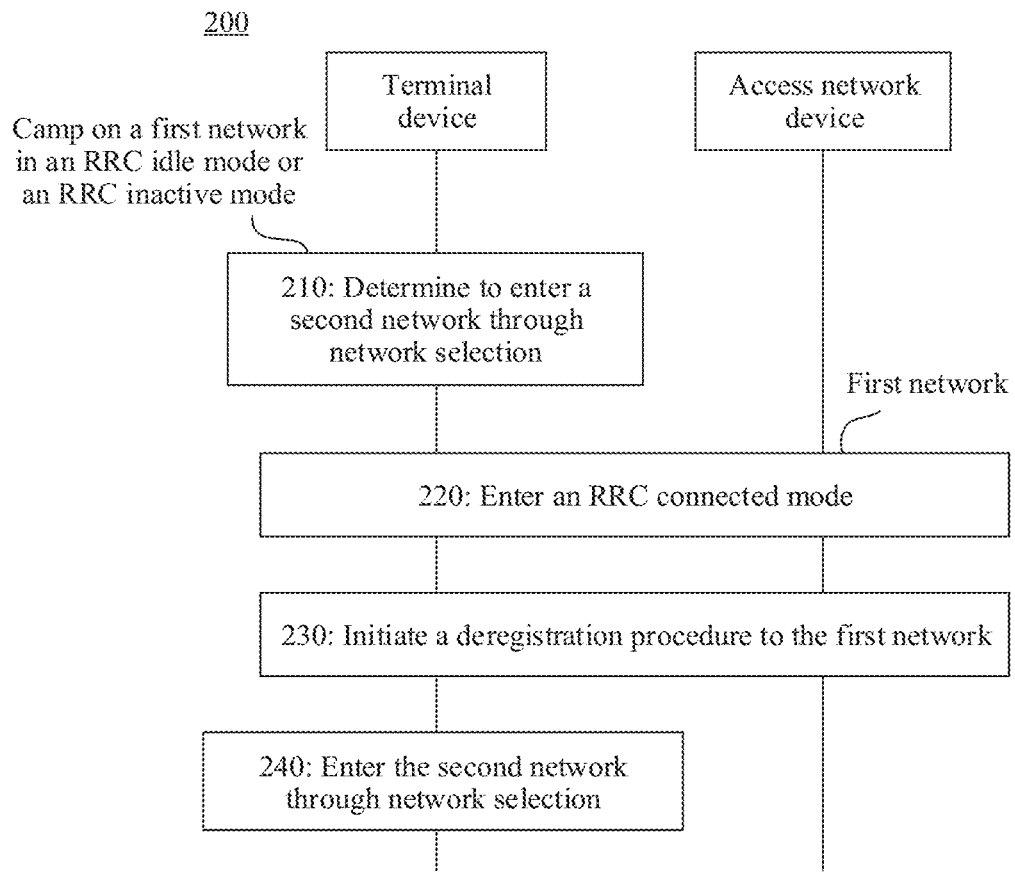
FIG. 5 is a schematic flowchart of an example of a communication method according to an embodiment of this application.

FIG. 5 is a schematic flowchart of a communication method 200 according to this application. The following describes the communication method 200 provided in embodiments of this application with reference to FIG. 5. The method 200 includes the following steps:

Step 210: A terminal device camping on a first network in a radio resource control (RRC) idle mode or an RRC inactive mode determines that a terminal device needs to enter a second network through network selection.

Step 220: The terminal device enters an RRC connected mode.

Step 230: The terminal device initiates a deregistration procedure to the first network.

Specifically, in this embodiment of this application, the terminal device can access the first network, and can also access the second network. In other words, the terminal device in this embodiment of this application has a capability of accessing a plurality of different networks, and may perform network selection between the first network and the second network.

When the terminal device determines that the terminal device needs to leave the first network and enter the second network through network selection, if the terminal device currently camps on the first network in the RRC idle mode or the RRC inactive mode, the terminal device first enters the RRC connected mode, initiates the deregistration procedure to the first network, and leaves the first network only after the deregistration procedure is completed.

In this embodiment of this application, that the terminal device initiates the deregistration procedure to the first network means that the terminal device deregisters from the first network, so that the terminal device is in a deregistration mode in the first network. After the deregistration procedure is completed, almost all contexts (except a small part of information used to facilitate authentication) of the terminal device in the first network disappear, and the first network learns that the terminal device has left the network. When data of the terminal device arrives on a first network side, the terminal device is not paged. In some cases, deregistration in this application may also be understood as detachment.

According to this embodiment of this application, before leaving the first network, the terminal device in the RRC idle mode or the RRC inactive mode first enters the RRC connected mode, and deregisters from the first network through the deregistration procedure, to notify the first network that the terminal device is about to leave. Through the foregoing setting, ineffective paging of the terminal device by the first network can be avoided, and air interface resources and electric energy that is of an access network device can be saved.

Optionally, the deregistration procedure may be the deregistration procedure shown in FIG. 4, or may be a deregistration procedure in another form. This is not limited in this application.

Optionally, in addition to being capable of accessing the first network and the second network, the terminal device may further have a capability of accessing another network. This is not limited in this application.

In step 210, the terminal device determines that the terminal device needs to enter the second network through network selection, to be specific, the terminal device determines that the terminal device needs to leave the first network, and enters the second network through network selection.

Optionally, the first network may be a public network, the second network may be a stand-alone non-public network, and the terminal device may determine, based on a status change of a stand-alone non-public network access mode, that the terminal device needs to enter the second network through network selection.

Optionally, the network selection may be automatic network selection, or may be manual network selection by a user. This is not limited in this application.

In this embodiment of this application, the first network and the second network are two different networks, and the first network and the second network may be of a same type or different types. This is not limited in this application. For example, the first network may be any one of the public network, the stand-alone non-public network, a non-stand-alone non-public network, a non-terrestrial network, and the like, and the second network may also be any one of the public network, the stand-alone non-public network, the non-stand-alone non-public network, the non-terrestrial network, and the like.

Standards of the first network and the second network may be the same, or may be different. This is not limited in this application. For example, the standards may include a 5G system, an LTE system, a WCDMA system, a code division multiple access (CDMA) system, a GSM system, and the like.

Optionally, mobility may be supported between the first network and the second network. That mobility is supported is described below by using an example.

Optionally, that mobility is supported between the first network and the second network may mean that the terminal device can perform cell handover and cell reselection between the first network and the second network.

Optionally, that mobility is supported between the first network and the second network may mean that the first network and the second network share a same core network device (for example, share a same AMF, and the AMF is used as an example for description below).

Optionally, that mobility is supported between the first network and the second network may mean that control plane signaling interworking can be performed between an AMF of the first network and an AMF of the second network.

For example, the first network may be the public network, and the second network may be the non-stand-alone non-public network depending on the public network. Alternatively, the first network may be the non-stand-alone non-public network, and the second network may be the public network on which the non-stand-alone non-public network depends.

For another example, the first network and the second network may be two non-stand-alone non-public networks depending on a same public network.

In this embodiment of this application, optionally, mobility may not be supported between the first network and the second network. That mobility is not supported is described below by using an example.

Optionally, that mobility is not supported between the first network and the second network may mean that the terminal device cannot perform cell handover and cell reselection between the first network and the second network.

Optionally, that mobility is not supported between the first network and the second network may mean that the first network and the second network use respective AMFs, and control plane signaling interworking cannot be performed between the AMFs.

For example, the first network may be the stand-alone non-public network, and the second network may be any one of the public network, the non-stand-alone non-public network, the non-terrestrial network, and another stand-alone non-public network.

For another example, the first network may be any one of the public network, the non-stand-alone non-public network, the non-terrestrial network, and the stand-alone non-public network, and the second network may be another stand-alone non-public network.

Mobility is not supported between the first network and the second network, and consequently a core network device in the first network and a core network device in the second network cannot exchange context information of the terminal device. To be specific, the core network device cannot actively initiate the deregistration procedure of the terminal device. Therefore, the method 200 provided in this embodiment of this application is more meaningful.

In step 220, the terminal device enters the RRC connected mode from the RRC idle mode or the RRC inactive mode. To be specific, in this case, the terminal device establishes or resumes an RRC connection to the access network device shown in FIG. 5.

Optionally, the access network device may be an access network device that previously provides a service for the terminal device, or may be another access network device. This is not limited in this application.

Optionally, in this case, a cell connected to the terminal device may be a cell on which the terminal device camps, or may be another cell in the first network. This is not limited in this application.

Optionally, the terminal device connects to a first cell, and the first cell is a cell of the first network on which the terminal device currently camps, or the first cell is another cell of the first network. To be specific, in this case, the terminal device connects to the first network to initiate the deregistration procedure to the first network.

Optionally, the method 200 provided in this embodiment of this application further includes step 240.

In step 240, after completing deregistration from the first network, the terminal device enters the second network through network selection.

Optionally, the terminal device may enter the second network through automatic network selection or manual network selection. This is not limited in this application.

Figure 6:
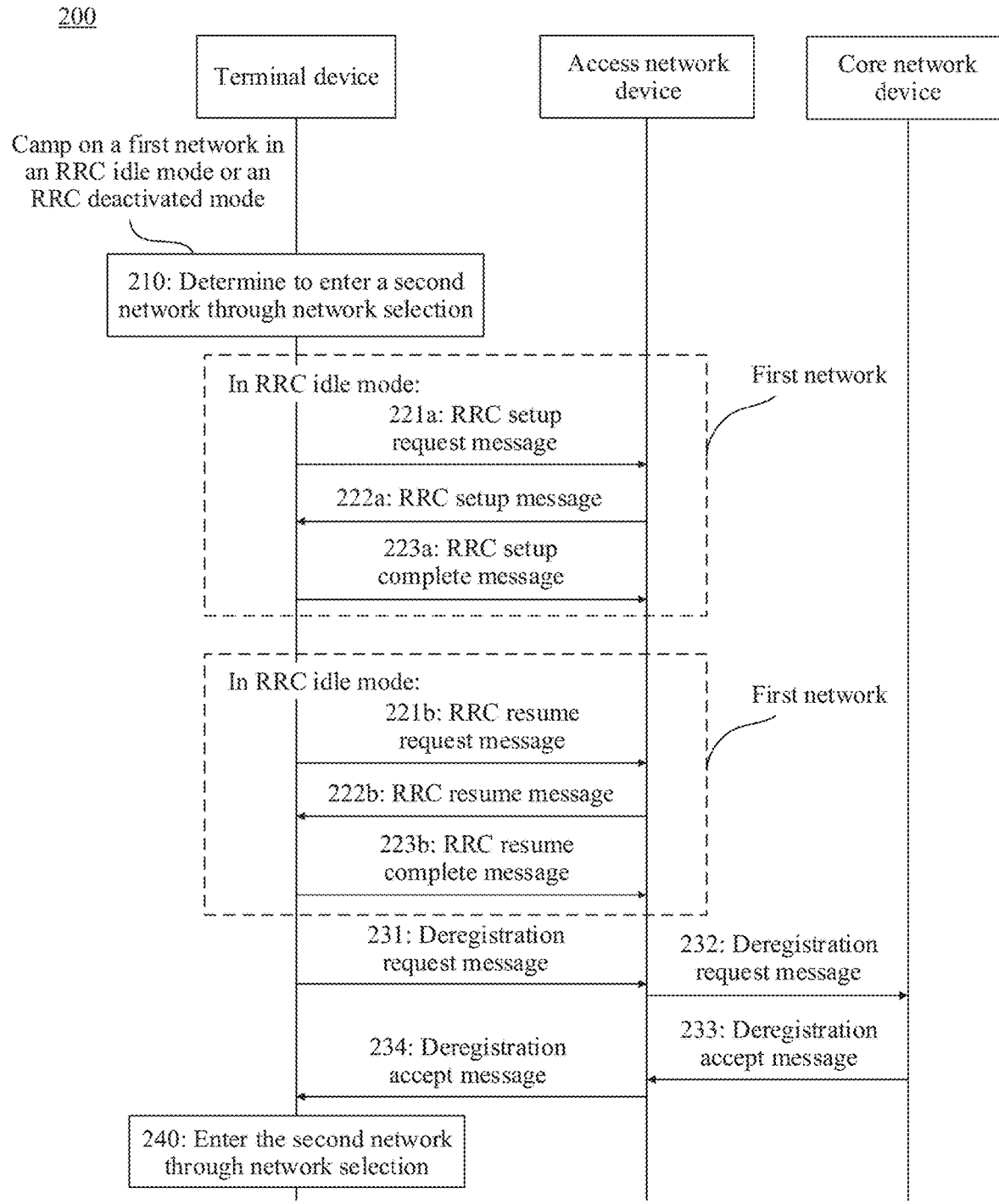
FIG. 6 is a schematic flowchart of another example of a communication method according to an embodiment of this application.

FIG. 6 is a schematic flowchart of an embodiment of a communication method 200. As shown in FIG. 6, a process in which a terminal device enters the RRC connected mode in step 220 may be different based on different statuses of the terminal device.

Specifically, in step 210, if the terminal device camps on the first network in the RRC idle mode, step 220 further includes steps 221*a*, 222*a*, and 223*a*.

In step 221*a*, the terminal device sends an RRC setup request message to the access network device through random access, to request to establish an RRC connection to the access network device. The RRC setup request message may carry information such as an identifier of the terminal device and a connection setup reason.

Optionally, the random access may be any one of contention-based random access, non-contention-based random access, four-step random access, or two-step random access.

Optionally, the RRC setup request message may be the third message (Msg3) in the four-step contention-based random access shown in FIG. 3.

In step 222*a*, the terminal device receives an RRC setup message sent by the access network device. If the access network device determines to agree to establish the RRC connection to the terminal device, the access network device sends the RRC setup message to the terminal device. The RRC setup message carries a series of configuration information.

Optionally, the RRC setup request message may be the fourth message (Msg4) in the four-step contention-based random access shown in FIG. 3.

In step 223*a*, the terminal device sends an RRC setup complete message to the access network device.

The terminal device establishes the RRC connection to the access network device by using the foregoing steps. The access network device may be an access network device in the first network. In other words, the terminal device in the idle mode may establish the RRC connection to the first network, and initiate the deregistration procedure to the first network.

In step 210, if the terminal device camps on the first network in the RRC inactive mode, step 220 further includes steps 221*b*, 222*b*, and 223*b*.

In step 221*b*, the terminal device sends an RRC resume request message to the access network device through random access, to request to resume the RRC connection to the access network device.

Optionally, the random access may be any one of contention-based random access, non-contention-based random access, four-step random access, or two-step random access.

Optionally, the RRC resume request message may be the third message (Msg3) in the four-step contention-based random access shown in FIG. 3.

In step 222*b*, the terminal device receives an RRC resume message sent by the access network device. If the access network device determines to agree to resume the RRC connection to the terminal device, the access network device sends the RRC resume message to the terminal device.

Optionally, the RRC resume message may be the fourth message (Msg4) in the four-step contention-based random access shown in FIG. 3.

In step 223*b*, the terminal device sends an RRC resume complete message to the access network device.

The terminal device resumes the RRC connection to the access network device through the foregoing steps. Because the terminal device originally camps on the first network, through the foregoing steps, the terminal device may resume the RRC connection to the first network, and initiate the deregistration procedure to the first network.

In step 230, the terminal device initiates the deregistration procedure to the first network. How the terminal device initiates the procedure is not limited in this application. As shown in FIG. 5, in this embodiment of this application, step 230 further includes step 231.

In step 231, the terminal device sends a deregistration request message to the access network device. The deregistration request message may include an identifier of the terminal device, to request the terminal device to deregister from the first network.

Optionally, the deregistration request message may be carried in the RRC setup complete message or the RRC resume message. To be specific, the deregistration request message and the RRC setup complete message or the RRC resume message may be sent as one message, so that signaling overheads can be reduced.

Optionally, the identifier of the terminal device may be a 5G globally unique temporary identity (5G-GUTI). The 5G-GUTI may include two parts: a globally unique AMF identifier (GUAMI) and a 5G system architecture evolution temporary mobile subscriber identity (5G s-temporary mobile subscriber identity, 5G-S-TMSI). After receiving the 5G-GUTI, the access network device can find, based on the GUAMI in the 5G-GUTI, an AMF with which the terminal device registers.

It is easy to understand that the terminal device initiates the deregistration procedure to the first network, and the identifier of the terminal device included in the deregistration request message should be the identifier of the terminal device in the first network.

Optionally, the deregistration request message further includes deregistration type indication information, and the deregistration type indication information may indicate that the reason why the terminal device is deregistered from another network is that the terminal device has gone to another network.

For example, the deregistration type indication information may indicate that the terminal device has entered the stand-alone non-public network, the non-stand-alone non-public network, the public network, or the non-terrestrial network (in this case, a type of the second network is the stand-alone non-public network, the non-stand-alone non-public network, the public network, or the non-terrestrial network).

For another example, the deregistration type indication information may indicate that the terminal device has gone to the second network.

Optionally, the deregistration request message further includes network selection indication information, used to indicate that the reason why the terminal device performs deregistration is that the terminal device has entered another network through network selection. For example, the network selection indication information may be a specially specified information element in the deregistration request message, and the information element may be one or more bits. This is not limited in this application.

Further, if a core network device determines, based on the deregistration request message (for example, based on the deregistration type information and/or the network selection indication information in the deregistration request message), that the reason why the terminal device performs deregistration is that the terminal device has entered another network through network selection, the core network device may choose to retain (or suspend) context information of the terminal device, instead of releasing the context information. The foregoing setting can help the terminal device quickly enter the first network next time.

Optionally, the deregistration request message may further include access type indication information, and the access type indication information is used to indicate a network to which the deregistration request message is applied.

For example, a type of the first network may be any one of the stand-alone non-public network, the non-stand-alone non-public network, the public network, the non-terrestrial network, or the like. The deregistration type information may indicate that the deregistration request message is applied to the stand-alone non-public network, the non-stand-alone non-public network, the public network, or the non-terrestrial network.

For another example, the access type indication information is used to indicate that the deregistration request message is applied to the first network.

Optionally, the deregistration procedure may further include steps 232, 233, and 234.

In step 232, the access network device sends the deregistration request message to the core network device.

In step 233, the core network device sends a deregistration accept message to the access network device.

In step 234, the access network device sends the deregistration accept message to the terminal device.

Specifically, after receiving the deregistration request message, the access network device finds, based on the GUAMI in the message, the core network device with which the terminal device registers, and forwards the deregistration request message to the core network device. Optionally, the deregistration request message may be transmitted by using a NAS stratum, that is, the terminal device transparently transmits the deregistration request message to the core network device by using the access network device.

Optionally, the core network device may be an AMF.

The core network device receives the deregistration request message, and sends the deregistration accept message to the access network device after completing a related deregistration procedure on a core network side.

The access network device forwards the deregistration accept message to the terminal device. After receiving the deregistration accept message, the terminal device releases a signal connection to a network side, to complete the deregistration procedure. In this case, the terminal device has almost no context (except a small part of information used to facilitate authentication) on a core network device side, and it may be simply considered that the terminal device does not exist in the network.

Currently, an increasing quantity of terminal devices support insertion of two subscriber identity module (subscriber identification module, SIM) cards at the same time. For example, one of the SIM cards is used for a private service and the other is used for a work service; or one of the SIM cards is used for a data service and the other is used for a voice service. This service mode may be referred to as dual SIM mode. The dual SIM cards may belong to a same mobile operator or different mobile operators, or the dual SIM cards may use a same standard or different standards. For example, the standards may include a 5G system, an LTE system, a WCDMA system, a CDMA system, a GSM system, and the like.

The terminal device that supports the dual SIM cards may also be referred to as a terminal device that supports two "subscriber identities". The "subscriber identity" is further described below.

In embodiments of this application, the "subscriber identity" (for example, a first subscriber identity or a second subscriber identity) is a logical concept. For example, the "subscriber identity" may correspond to a subscriber identity module (subscriber identification module, SIM) card, subscriber information, a virtual SIM card, or a subscriber identity (for example, an international mobile subscriber identity (IMSI) or a temporary mobile subscriber identity (TMSI)). From a perspective of a network side, different "subscriber identities" logically correspond to different communication entities served by a network side. For example, a terminal device supporting two subscriber identities may be considered as two communication entities for the network side. For another example, when the "subscriber identity" corresponds to a SIM card or subscriber information, the network side may identify a terminal device supporting a plurality of different SIM cards or a plurality of pieces of subscriber information as a plurality of different communication entities, even though the terminal device supporting the plurality of different SIM cards or the plurality of pieces of subscriber information is actually only one physical entity. It should be noted that in this embodiment of this application, an example in which the "subscriber identity" corresponds to the SIM card is mainly used for description.

For example, the SIM card may be understood as a key for the terminal device to access a mobile network. For ease of description, in embodiments of this application, the SIM card and evolution thereof are collectively referred to as the SIM card. For example, the SIM card may be an identity card of a digital mobile phone user of a global system for mobile communications (GSM). The SIM card is configured to store an identification number and a secret key of a user, and support authentication for the user by the GSM system. For another example, the SIM card may be a universal subscriber identity module (USIM) card, and may be referred to as an upgraded SIM card. For still another example, the SIM card may be another form that can identify the subscriber identity, such as a universal integrated circuit card (UICC), an embedded-SIM card (embedded-SIM, eSIM), or a software SIM card. In embodiments of this application, the SIM card is used as an example for description. This does not constitute a limitation on this application.

Figure 7:
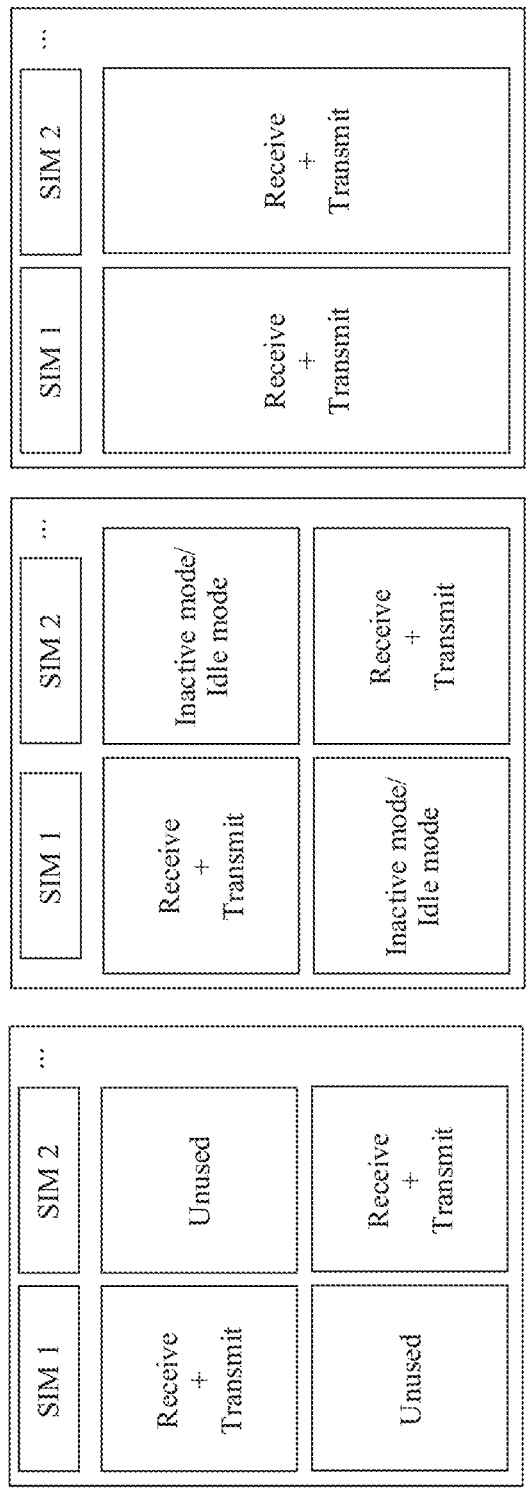
FIG. 7($a$), FIG. 7($b$) and FIG. 7($c$) are a schematic diagram of three terminal devices supporting dual SIMs according to an embodiment of this application.

The following describes a terminal device that supports two subscriber identities, for example, a terminal device that supports two SIM cards. A base station of a SIM may also be referred to as a base station corresponding to a subscriber identity of the terminal device, and this may be understood as that the base station serves a communication entity corresponding to the SIM. FIG. 7(a), FIG. 7(b) and FIG. 7(c) are a schematic diagram of three terminal devices supporting dual SIMs according to an embodiment of this application. Based on different transceiver capabilities of the terminal devices, there may be the following three modes of dual-SIM terminal devices.

FIG. 7(a) shows a passive mode in which only one SIM card can be used at a moment, that is, can be used for receiving and transmitting, and the other card is unused, although the two SIM cards can be inserted.

FIG. 7(b) shows a dual SIM dual standby (DSDS) mode. Two SIM cards share one transceiver. A terminal device in an RRC idle mode needs to listen to paging messages of the two cards, for example, in a time-division multiplexing (TDM) manner. When there is an RRC connection between the terminal device and a base station of one of the SIMs (for example, an SIM 1), when the SIM 1 enters an RRC connected mode, or when the SIM 1 enters the RRC connected mode with a first subscriber identity, to send and receive data, the terminal device cannot maintain the RRC connection between the terminal device and a base station of the other SIM (for example, an SIM 2), or the SIM 2 is in the RRC idle mode or an RRC inactive mode, or the terminal device is in the RRC idle mode or the RRC inactive mode with a second subscriber identity.

FIG. 7(c) shows a dual SIM dual active (DSDA) mode in which two SIM cards correspond to respective transceivers. The two SIM cards may be in the RRC connected mode at the same time, in other words, in the RRC connected mode at the same time with two subscriber identities, that is, the terminal device can receive and send data of the two SIM cards at the same time.

It is easy to understand that the terminal device in the method 200 shown in FIG. 5 or FIG. 6 may be a terminal device having only one SIM card, or may have only one subscriber identity. The subscriber identity can access a first network, and can also access a second network. When the subscriber identity needs to leave the first network and enters the second network through network selection, the subscriber identity in the RRC idle mode or the RRC inactive mode may enter the RRC connected mode, and initiate a deregistration procedure to the first network, so that the subscriber identity is deregistered from the first network.

In addition, the terminal device in the method 200 may have two or more SIM cards, or have two or more subscriber identities. However, the method 200 is mainly for a subscriber identity (denoted as a subscriber identity #1) in a plurality of subscriber identities. Specifically, the subscriber identity #1 can access both the first network and the second network. When the subscriber identity #1 needs to leave the first network and enters the second network through network selection, the subscriber identity #1 in the RRC idle mode or the RRC inactive mode may enter the RRC connected mode, and initiate the deregistration procedure to the first network by using the subscriber identity #1.

Based on this, this application further provides a communication method 300. The communication method 300 is applicable to the foregoing terminal device having dual SIM cards or even more SIM cards, or the communication method 300 is applicable to a terminal device having two or more subscriber identities. A difference from the foregoing method 200 lies in that in the method 300, when a subscriber identity (denoted as the first subscriber identity) needs to be deregistered, another subscriber identity (denoted as the second subscriber identity) may be used to initiate the deregistration procedure of the first subscriber identity.

Figure 8:
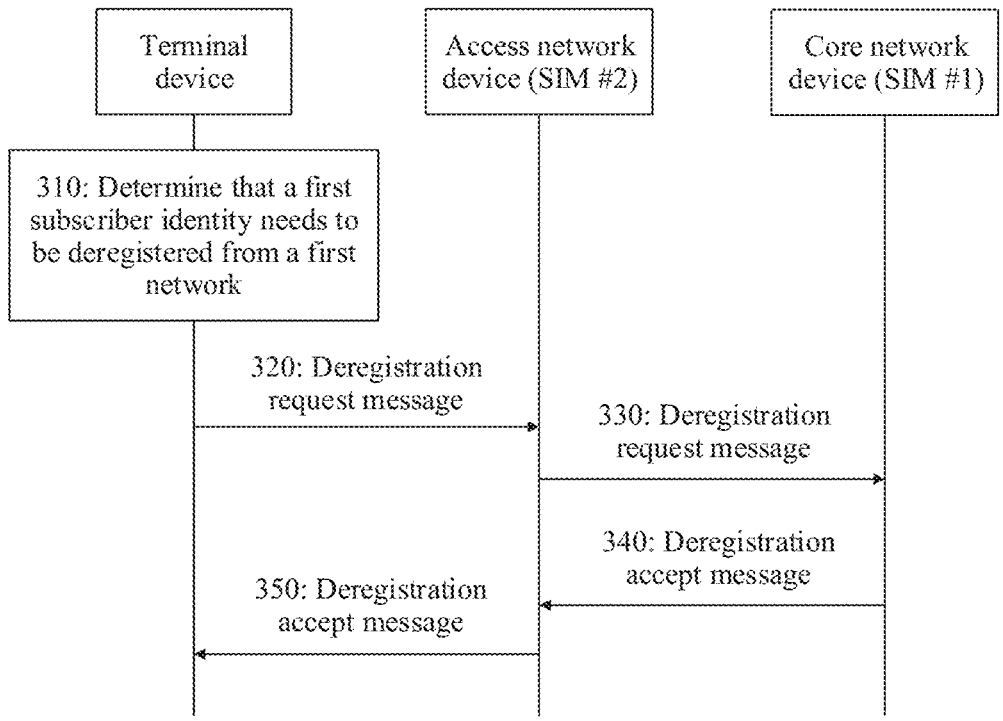
FIG. 8 is a schematic flowchart of still another example of a communication method according to an embodiment of this application.

With reference to the accompanying drawings, the following describes the communication method 300 provided in this embodiment of this application. FIG. 8 is a schematic flowchart of the communication method 300 according to this application. In this embodiment of this application, only a terminal device supporting two subscriber identities (for example, supporting dual SIM cards) is used for description. It should be understood that the communication method 300 in this embodiment of this application may be further applicable to a terminal device supporting more than two subscriber identities (for example, supporting three, four, or more SIM cards). The method 300 includes the following steps.

Step 310: A terminal device determines that a first subscriber identity needs to be deregistered from a first network, where the terminal device supports the first subscriber identity and a second subscriber identity.

Step 320: The terminal device sends a deregistration request message to an access network device by using the second subscriber identity, where the deregistration request message carries an identifier of the first subscriber identity, and the deregistration request message is used to request to deregister the first subscriber identity from the first network.

Correspondingly, in step 320, the access network device receives the deregistration request message sent by the terminal device.

In step 330, the access network device sends the deregistration request message to a core network device.

Correspondingly, the core network device receives the deregistration request message sent by the access network device.

In this embodiment of this application, the terminal device supports the first subscriber identity (for example, a SIM #1) and the second subscriber identity (for example, a SIM #2). The first subscriber identity can access the first network, and has accessed the first network. In this case, a core network device (for example, an AMF) of the first network stores context information of the first subscriber identity.

When the terminal device determines that the first subscriber identity needs to be deregistered (or detached) from the first network, the terminal device may send the deregistration request message to the access network device by using the second subscriber identity, or the terminal device sends the deregistration request message to the access network device by using the second subscriber identity. The deregistration request message carries the identifier of the first subscriber identity, and the deregistration request message is used to request to deregister the first subscriber identity from the first network.

Further, after receiving the deregistration request message, the access network device may transparently transmit the message to a core network device that manages the second subscriber identity. Optionally, when a core network device that manages the first subscriber identity is the same as the core network device that manages the second subscriber identity, the core network device directly completes a related deregistration procedure for the first subscriber identity. Optionally, when the core network device that manages the first subscriber identity and the core network device that manages the second subscriber identity are not the same but can communicate with each other, the core network device that manages the second subscriber identity forwards the deregistration request message to the core network device that manages the first subscriber identity, and the core network device completes the related deregistration procedure for the first subscriber identity.

According to the method 300 provided in this application, when the first subscriber identity in the terminal device needs to be deregistered from the first network, the deregistration request message for the first subscriber identity may be sent to the access network device by using the second subscriber identity, to initiate the deregistration procedure of the first subscriber identity to the first network, and notify the first network that the first subscriber identity is about to leave. Through the foregoing setting, ineffective paging to the first subscriber identity by the first network can be avoided, thereby saving air interface resources and electric energy that is of the access network device.

Optionally, the first network may be any one of a public network, a non-stand-alone non-public network, a non-terrestrial network, and a stand-alone non-public network.

The access network device provides a service for the second subscriber identity, that is, the access network device is an access network device to which a serving cell of the second subscriber identity belongs.

Optionally, before the terminal device sends the deregistration request message to the access network device by using the second subscriber identity, that is, before step 320, the second subscriber identity may be in an idle mode, an inactive mode, or a connected mode. This is not limited in this application.

For example, the second subscriber identity may be in the idle mode. In this case, before step 320, the second subscriber identity needs to first establish an RRC connection to the access network device.

For another example, the second subscriber identity may be in the inactive mode. In this case, before step 320, the second subscriber identity needs to first resume the RRC connection to the access network device.

Optionally, the access network device may belong to the first network, that is, the second subscriber identity is a user in the first network. In other words, the first subscriber identity and the second subscriber identity may belong to users in a same network. For example, the first subscriber identity and the second subscriber identity belong to a same operator.

Optionally, the access network device may also belong to a third network, that is, the second subscriber identity is a user in the third network. In other words, the first subscriber identity and the second subscriber identity may belong to users in different networks. In this case, mobility is supported between the third network and the first network, so that the deregistration procedure of the first subscriber identity may be initiated to the first network by using the third network. That mobility is supported between the third network and the first network is described in the following by using an example.

Optionally, that mobility is supported between the third network and the first network may mean that the second subscriber identity can perform cell handover and cell reselection between the third network and the first network.

Optionally, that mobility is supported between the third network and the first network may mean that the third network and the first network share a same core network device (for example, share a same AMF).

Optionally, that mobility is supported between the third network and the first network may mean that control plane signaling interworking can be performed between the core network device of the third network and the core network device of the first network.

For example, the first network may be the public network, and the third network may be the non-stand-alone non-public network depending on the public network. Alternatively, the first network may be the non-stand-alone non-public network, and the third network may be the public network on which the non-stand-alone non-public network depends.

For another example, the first network and the third network may be two non-stand-alone non-public networks depending on a same public network.

In step 310, the deregistration request message carries the identifier of the first subscriber identity. It is easy to understand that the identifier of the first subscriber identity should be an identifier of the first subscriber identity in the first network.

Optionally, the identifier of the first subscriber identity may be a 5G-GUTI. The 5G-GUTI includes two parts: a GUAMI and a 5G-S-TMSI.

In step 320, after receiving the deregistration request message, the access network device (specifically, the access network device of the second subscriber identity) finds, based on the GUAMI in the message, a core network device with which the first subscriber identity is registered. The core network device stores the context information of the first subscriber identity. In this case, the access network device forwards the deregistration request message to a found core network device.

Optionally, the core network device may be the AMF.

Optionally, the deregistration request message may be transmitted by using a NAS stratum, that is, the second subscriber identity transparently transmits the deregistration request message to the core network device by using the access network device.

In step 310, the terminal device determines that the first subscriber identity needs to be deregistered from the first network. In this application, how the terminal device determines that the first subscriber identity needs to be deregistered from the first network, or a reason why the first subscriber identity needs to be deregistered from the first network is not limited.

In a possible implementation, the terminal device determines that the first subscriber identity camping on the first network needs to enter a second network through network selection. In this case, the terminal device may determine that the first subscriber identity needs to be deregistered from the first network.

To be specific, when the first subscriber identity camping on the first network determines that the first subscriber identity needs to leave the first network and enters the second network in a network selection manner, the terminal device may determine that the first subscriber identity needs to be deregistered from the first network, to notify the first network that the first subscriber identity is about to leave, so that ineffective paging performed by the first network on the first subscriber identity is avoided, and the air interface resources and the electric energy that is of the access network device can be saved.

Optionally, the first subscriber identity may camp on the first network in an RRC idle mode or an RRC inactive mode. In this case, the terminal device may support a dual SIM dual standby mode, that is, the first subscriber identity and the second subscriber identity share a transceiver, and the second subscriber identity maintains the RRC connection to the access network device by using the transceiver.

Optionally, the terminal device may also support a dual SIM dual active mode, and the first subscriber identity and the second subscriber identity have respective transceivers. In this case, the second subscriber identity maintains the RRC connection to the access network device by using the transceiver of the second subscriber identity. This is not limited in this application.

Optionally, the terminal device may perform the foregoing step 320 after the first subscriber identity enters the second network. Through the foregoing setting, the first subscriber identity can enter the second network more quickly.

Optionally, the terminal device may alternatively first perform step 320, and then perform a related step of entering the second network as the first subscriber identity. This is not limited in this application.

In this embodiment of this application, the first network and the second network are two different networks, and the first network and the second network may be of a same type or different types. This is not limited in this application. For example, the first network may be any one of the public network, the stand-alone non-public network, the non-stand-alone non-public network, the non-terrestrial network, and the like, and the second network may also be any one of the public network, the stand-alone non-public network, the non-stand-alone non-public network, the non-terrestrial network, and the like.

Standards of the first network and the second network may be the same, or may be different. This is not limited in this application. For example, the standards may include a 5G system, an LTE system, a WCDMA system, a CDMA system, a GSM system, and the like.

In this embodiment of this application, mobility may be supported between the first network and the second network, or mobility may not be supported between the first network and the second network. This is not limited in this application.

For example, the first network may be the public network, and the second network may be the stand-alone non-public network. Alternatively, the first network may be the stand-alone non-public network, and the second network may be the public network.

In another possible implementation, the terminal device may support the dual SIM dual active mode, and the first subscriber identity and the second subscriber identity have respective transceivers. When the terminal device determines that the transceiver corresponding to the first subscriber identity breaks down and cannot be used, the terminal device may determine that the first subscriber identity needs to be deregistered from the first network.

In still another possible implementation, in some possible scenarios, for example, when the terminal device determines that the terminal device is to be powered off, the terminal device may determine that the first subscriber identity needs to be deregistered from the first network. In this case, the deregistration request message may alternatively carry an identifier of the second subscriber identity, and the deregistration request message is further used to request to deregister the second subscriber identity.

Optionally, it can be learned from the foregoing analysis that the second subscriber identity may belong to a user in the first network or the third network, that is, the deregistration request message is further used to request to deregister the second subscriber identity from the first network or the third network.

Optionally, the terminal device may support N (N is an integer greater than 2) subscriber identities. In this case, the deregistration request message may request to simultaneously deregister the N subscriber identities. The deregistration request message may include identifiers of the N subscriber identities. This is not limited in this application.

Optionally, the deregistration request message further includes deregistration type indication information, and the deregistration type indication information may indicate a reason why the terminal device is deregistered is that the terminal device has been powered off or has gone to another network.

For example, the deregistration type indication information may indicate that the first subscriber identity has gone to the stand-alone non-public network, the non-stand-alone non-public network, the public network, or the non-terrestrial network (in this case, a type of the second network is the stand-alone non-public network, the non-stand-alone non-public network, the public network, or the non-terrestrial network).

For another example, the deregistration type indication information may indicate that the terminal device has gone to the second network.

Optionally, the deregistration request message may further include access type indication information, and the access type indication information is used to indicate a network to which the deregistration request message is applied.

For example, a type of the first network may be any one of the stand-alone non-public network, the non-stand-alone non-public network, the public network, the non-terrestrial network, or the like. The deregistration type indication information may indicate that the deregistration request message is applied to the stand-alone non-public network, the non-stand-alone non-public network, the public network, or the non-terrestrial network.

For another example, the access type indication information is used to indicate that the deregistration request message is applied to the first network.

Optionally, the method 300 provided in this embodiment of this application further includes step 340 and step 350.

In step 340, the core network device sends a deregistration accept message to the access network device, where the deregistration accept message includes the identifier of the first subscriber identity.

Correspondingly, in step 340, the access network device receives the deregistration accept message sent by the core network device.

In step 350, the access network device sends the deregistration accept message to the second subscriber identity of the terminal device.

Correspondingly, in step 350, the terminal device receives the deregistration accept message sent by the access network device.

Specifically, the core network device receives the deregistration request message, and sends the deregistration accept message to the access network device after completing a related deregistration procedure on a core network side.

The access network device forwards the deregistration accept message to the second subscriber identity of the terminal device. After the terminal device receives the deregistration accept message, because the deregistration accept message includes the identifier of the first subscriber identity, the terminal device determines that the deregistration request for the first subscriber identity is received, and releases the first subscriber identity and a signal connection on the network side, to complete the deregistration procedure of the first subscriber identity. In this case, the first subscriber identity has almost no context (except a small part of information used to facilitate authentication) on a core network device side, and it may be simply considered that the first subscriber identity does not exist in the network.

It can be learned from the foregoing analysis that the deregistration request message may request to deregister a plurality of subscriber identities (for example, the foregoing N subscriber identities). Depending on whether a deregistration request for each subscriber identity is accepted, the deregistration accept message may be sent based on different cases. For example, a total of S deregistration requests for the N subscriber identities are accepted (S is an integer greater than or equal to 1 and less than or equal to N).

Optionally, for S deregistration accept subscriber identities, the terminal device may be indicated by using S deregistration accept messages, and each deregistration accept message carries an identifier of one subscriber identity.

Optionally, for the S deregistration accept subscriber identities, the terminal device may be indicated by using one deregistration accept message, and the deregistration accept message carries identifiers of the S subscriber identities.

It should be understood that, in the method 300 shown in FIG. 8, the terminal device supports the first subscriber identity and the second subscriber identity, and the second subscriber identity initiates a deregistration request for the first subscriber identity. Similarly, in another implementation, the first subscriber identity may also belong to another terminal device, that is, a terminal device may initiate the deregistration procedure to another terminal device. This is not limited in this application, and the foregoing case should also fall within the protection scope of this application.

The foregoing describes in detail the communication methods in embodiments of this application with reference to FIG. 1 to FIG. 8. The following describes in detail apparatuses in embodiments of this application with reference to FIG. 9 to FIG. 12. It should be understood that the apparatuses shown in FIG. 9 to FIG. 12 can implement one or more steps in the method procedure shown in FIG. 5, FIG. 6, or FIG. 8. To avoid repetition, details are not described herein again.

Figure 9:
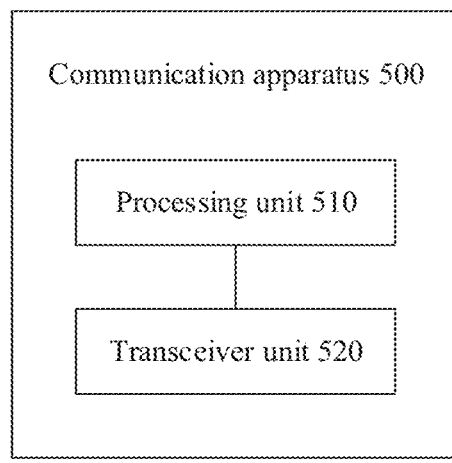
FIG. 9 is a schematic block diagram of an example of a communication apparatus according to an embodiment of this application.

FIG. 9 is a schematic block diagram of a communication apparatus 500 according to an embodiment of this application. As shown in FIG. 9, the apparatus 500 includes a processing unit 510 and a transceiver unit 520, where the processing unit 510 is configured to determine that the communication apparatus 500 that camps on a first network in a radio resource control (RRC) idle mode or an RRC inactive mode needs to enter a second network through network selection;

the processing unit 510 is further configured to control the communication apparatus 500 to enter an RRC connected mode; and the processing unit 510 is further configured to initiate a deregistration procedure to the first network by using the transceiver unit 520.

Optionally, the processing unit 510 is further configured to control the communication apparatus 500 to connect to a first cell, where the first cell is a cell of the first network on which the communication apparatus 500 currently camps, or the first cell is another cell of the first network.

In another implementation, the processing unit 510 is configured to determine that a first subscriber identity needs to be deregistered from the first network, and the communication apparatus 500 supports the first subscriber identity and a second subscriber identity.

The transceiver unit 520 is configured to send a deregistration request message to an access network device by using the second subscriber identity, where the deregistration request message carries an identifier of the first subscriber identity, and the deregistration request message is used to request to deregister the first subscriber identity from the first network.

Optionally, the access network device belongs to the first network, or the access network device belongs to a third network, and mobility is supported between the third network and the first network.

Optionally, the deregistration request message may further carry an identifier of the second subscriber identity, and the deregistration request message is further used to request to deregister the second subscriber identity.

Optionally, the transceiver unit 520 is further configured to receive a deregistration accept message sent by the access network device by using the second subscriber identity, where the deregistration accept message carries the identifier of the first subscriber identity.

Optionally, the processing unit 510 is further configured to determine that the first subscriber identity that camps on the first network needs to enter the second network through network selection.

Specifically, the communication apparatus 500 may correspond to the terminal device in the communication method 200 or the communication method 300 in embodiments of this application, or a chip disposed in the terminal device. The communication apparatus 500 may include units configured to perform the method performed by the terminal device in the communication method 200 in FIG. 5 or FIG. 6 or the communication method 300 in FIG. 8. In addition, the units in the communication apparatus 500 and the foregoing other operations and/or functions are used to implement corresponding procedures of the communication method 200 in FIG. 5 or FIG. 6 or the communication method 300 in FIG. 8. Specific processes of performing the foregoing corresponding steps by the units are described in detail in the method 200 and the method 300. For brevity, details are not described herein again.

The communication apparatus 500 may be an intelligent terminal, a wearable device, or the like, and the transceiver unit 520 may be a transceiver or a transceiver circuit. Optionally, the transceiver may alternatively be an input/output circuit or interface.

The communication apparatus 500 may alternatively be a chip. The transceiver unit 520 may be an input/output circuit or an interface of the chip.

In a possible implementation, the communication apparatus 500 may be a terminal device 50. A function of the processing unit 510 may be implemented by a processor 502 in the terminal device 50, and a function of the transceiver unit 520 may be implemented by a transceiver 501 (that is, a control circuit together with an antenna) of the terminal device. The following describes a structure of a terminal device in an embodiment of this application with reference to FIG. 10.

Figure 10:
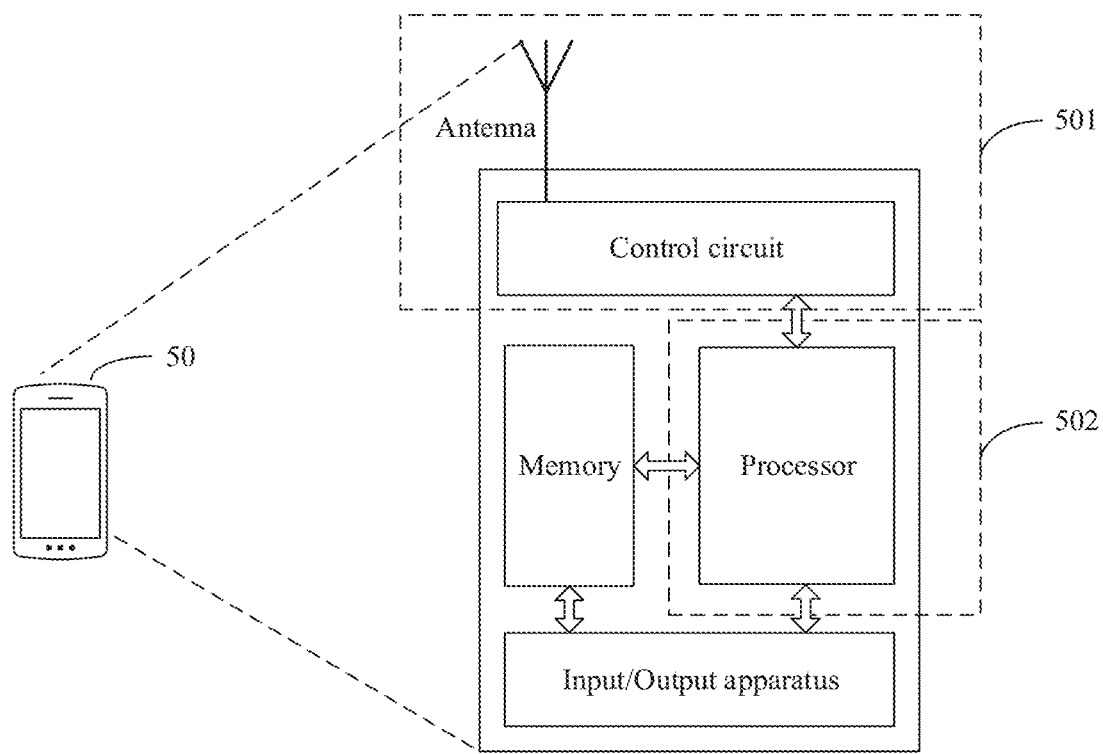
FIG. 10 is a schematic diagram of a structure of a terminal device according to an embodiment of this application.

FIG. 10 is a schematic diagram of a structure of a terminal device according to an embodiment of this application. The terminal device is applicable to the system shown in FIG. 1, and perform functions of the terminal device in the foregoing method embodiments. For ease of description, FIG. 10 shows only main components of the terminal device. As shown in FIG. 10, the terminal device 50 includes a processor, a memory, a control circuit, an antenna, and an input/output apparatus. The processor is mainly configured to process a communication protocol and communication data, control the entire terminal device, execute a software program, and process data of the software program, for example, configured to support the terminal device in performing actions described in the foregoing method embodiment. The memory is mainly configured to store the software program and the data. The control circuit is mainly configured to convert a baseband signal and a radio frequency signal, and process the radio frequency signal. The control circuit together with the antenna may also be referred to as a transceiver, mainly configured to receive and send a radio frequency signal in a form of an electromagnetic wave. The input/output apparatus such as a touchscreen, a display screen, or a keyboard is mainly configured to: receive data entered by a user, and output data to the user.

After the terminal device is powered on, the processor may read the software program in the memory, explain and execute instructions of the software program, and process the data of the software program. When data needs to be sent wirelessly, after performing baseband processing on the to-be-sent data, the processor outputs a baseband signal to a radio frequency circuit. After performing radio frequency processing on the baseband signal, the radio frequency circuit sends a radio frequency signal in a form of an electromagnetic wave through the antenna. When data is sent to the terminal device, the radio frequency circuit receives the radio frequency signal through the antenna, converts the radio frequency signal into a baseband signal, and outputs the baseband signal to the processor, and the processor converts the baseband signal into data and processes the data.

A person skilled in the art may understand that, for ease of description, FIG. 10 shows only one memory and only one processor. An actual terminal device may include a plurality of processors and a plurality of memories. The memory may also be referred to as a storage medium, a storage device, or the like. The memory may be a storage element located on a same chip as the processor, namely, an on-chip storage element, or an independent storage element. This is not limited in this embodiment of this application.

In an optional implementation, the terminal device may include a baseband processor and a central processing unit. The baseband processor is mainly configured to process the communication protocol and the communication data. The central processing unit is mainly configured to control the entire terminal device, execute the software program, and process the data of the software program. Functions of the baseband processor and the central processing unit may be integrated into the processor in FIG. 10. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and all components of the terminal device may be connected to each other by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the memory in a form of a software program. The processor executes the software program to implement a baseband processing function.

In this embodiment of this application, the control circuit and the antenna having a transceiver function may be considered as a transceiver unit 501 of the terminal device 50. For example, the transceiver unit 501 is configured to support the terminal device in performing a receiving function and a sending function. A processor 502 having a processing function is considered as a processing unit 502 of the terminal device 50. As shown in FIG. 10, the terminal device 50 includes the transceiver unit 501 and the processing unit 502. The transceiver unit may also be referred to as a transceiver, a transceiver machine, a transceiver apparatus, or the like. Optionally, a component configured to implement the receiving function in the transceiver unit 501 may be considered as a receiving unit, and a component configured to implement the sending function in the transceiver unit 501 may be considered as a sending unit. In other words, the transceiver unit 501 includes the receiving unit and the sending unit. The receiving unit may also be referred to as a receiver machine, an input port, a receiver circuit, or the like. The sending unit may be referred to as a transmitter machine, a transmitter, a transmitter circuit, or the like.

The processor 502 may be configured to execute instructions stored in the memory to control the transceiver unit 501 to receive a signal and/or send a signal, to complete the functions of the terminal device in the foregoing method embodiments. The processor 502 further includes an interface, configured to implement a signal input/output function.

In an implementation, a function of the transceiver unit 501 may be implemented by using a transceiver circuit or a dedicated transceiver chip.

Figure 11:
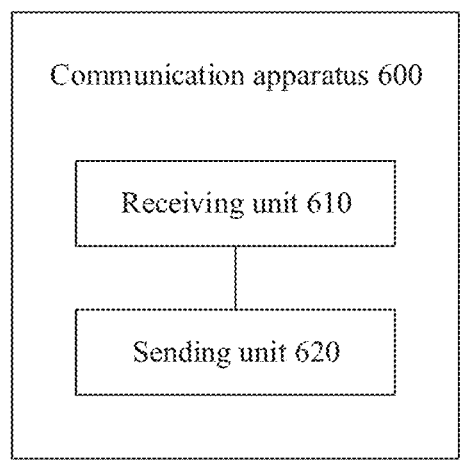
FIG. 11 is another schematic block diagram of a communication apparatus according to an embodiment of this application.

FIG. 11 is a schematic block diagram of a communication apparatus 600 according to an embodiment of this application. As shown in FIG. 11, the apparatus 600 includes a receiving unit 610 and a sending unit 620.

The receiving unit 610 is configured to receive a deregistration request message sent by a terminal device by using a second subscriber identity, where the deregistration request message carries an identifier of a first subscriber identity, and the deregistration request message is used to request to deregister the first subscriber identity from a first network; and the sending unit 620 is configured to send the deregistration request message to a core network device.

Optionally, the communication apparatus 600 belongs to the first network, or the communication apparatus 600 belongs to a third network, and mobility is supported between the third network and the first network.

Optionally, the deregistration request message may further carry an identifier of the second subscriber identity, and the deregistration request message is further used to request to deregister the second subscriber identity.

Optionally, the sending unit 620 is further configured to send a deregistration accept message to the second subscriber identity of the terminal device, where the deregistration accept message carries the identifier of the first subscriber identity.

Specifically, the communication apparatus 600 may correspond to the access network device in the communication method 200 or the communication method 300 in embodiments of this application, or a chip disposed in the access network device. The communication apparatus 600 may include units configured to perform the method performed by the access network device in the communication method 200 in FIG. 5 or FIG. 6 or the communication method 300 in FIG. 8. In addition, the units in the communication apparatus 600 and the foregoing other operations and/or functions are used to implement corresponding procedures of the communication method 200 in FIG. 5 or FIG. 6 or the communication method 300 in FIG. 8. Specific processes of performing the foregoing corresponding steps by the units are described in detail in the method 200 and the method 300. For brevity, details are not described herein again.

In a possible implementation, the communication apparatus 600 may be a base station, a gNB, a TRP, a DU, a CU, a CU-CP (control plane), a CU-UP (user plane), or the like. The receiving unit 610 and the sending unit 620 may be a transceiver or a transceiver circuit. Optionally, the transceiver may alternatively be an input/output circuit or interface.

The communication apparatus 600 may alternatively be a chip. The receiving unit 610 and the sending unit 620 may be an input/output circuit or interface of the chip.

In a possible implementation, the communication apparatus 600 may be an access network device, for example, a base station 60 below. Functions of the receiving unit 610 and the sending unit 620 may be implemented by using an RRU 601 of the base station 60. The following describes a structure of a network device in an embodiment of this application with reference to FIG. 12.

Figure 12:
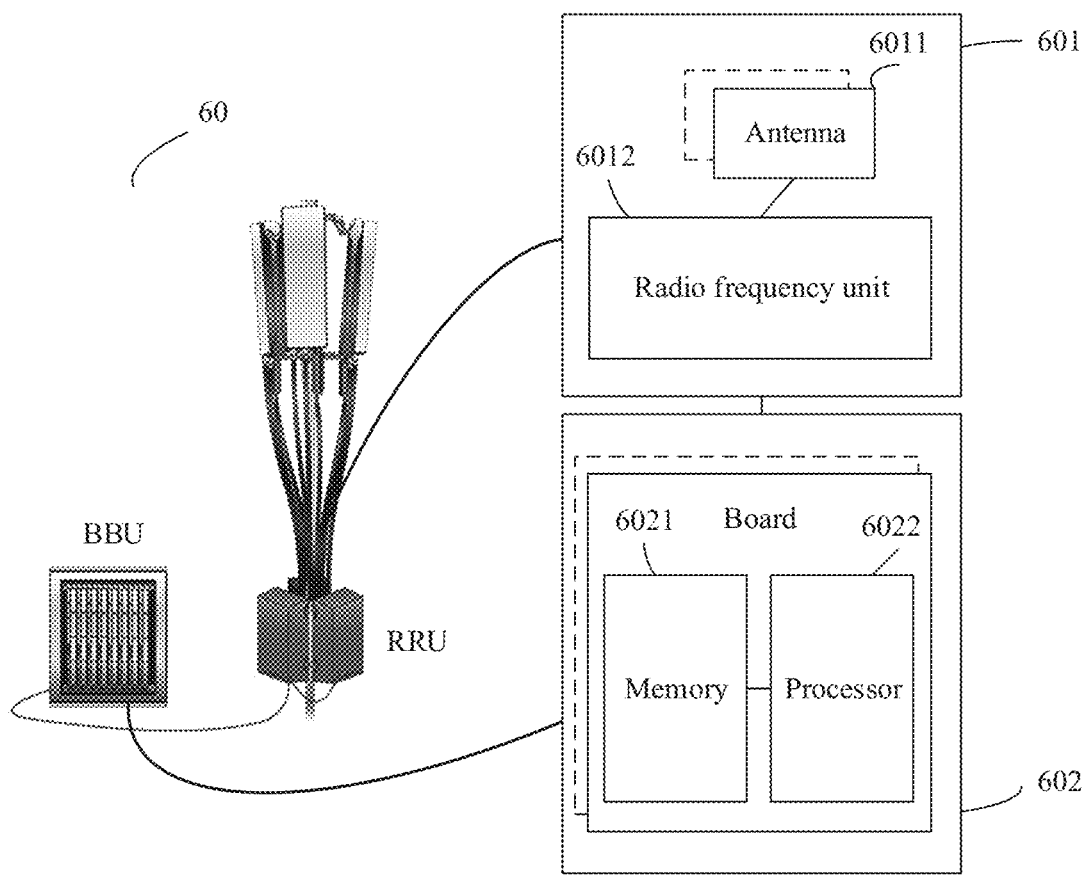
FIG. 12 is a schematic diagram of a structure of an access network device according to an embodiment of this application.

FIG. 12 is a schematic diagram of a structure of an access network device according to an embodiment of this application, for example, may be a schematic diagram of a structure of a base station. As shown in FIG. 12, the base station may be used in the system shown in FIG. 1, to perform functions of the access network device in the foregoing method embodiments. The base station 60 may include one or more radio units, such as a remote radio unit (RRU) 601 and one or more baseband units (BBUs) (which may also be referred to as digital units, (DUs)) 602. The RRU 601 may be referred to as a transceiver unit, a transceiver machine, a transceiver circuit, a transceiver, or the like, and may include at least one antenna 6011 and a radio frequency unit 6012. The RRU 601 is mainly configured to send and receive a radio frequency signal, and perform conversion between the radio frequency signal and a baseband signal. For example, the RRU 601 is configured to send the signaling message in the foregoing embodiments to a terminal device. The BBU 602 is mainly configured to perform baseband processing, control the base station, and the like. The RRU 601 and the BBU 602 may be physically disposed together; or may be physically and separately disposed, that is, the base station is a distributed base station.

The BBU 602 is a control center of the base station, may also be referred to as a processing unit, and is mainly configured to implement a baseband processing function, such as channel coding, multiplexing, modulation, or spread spectrum. For example, the BBU (the processing unit) 602 may be configured to control the base station to perform the operation procedures of the network device in the foregoing method embodiments.

In an example, the BBU 602 may include one or more boards. A plurality of boards may jointly support a radio access network (such as an LTE network) of a single access standard, or may separately support radio access networks (such as an LTE network, a 5G network, or another network) of different access standards. The BBU 602 further includes a memory 6021 and a processor 6022, and the memory 6021 is configured to store necessary instructions and data. For example, the memory 6021 stores a correspondence between a codebook index and a precoding matrix in the foregoing embodiments. The processor 6022 is configured to control the base station to perform necessary actions, for example, to control the base station to perform the operation procedures of the network device in the foregoing method embodiments. The memory 6021 and the processor 6022 may serve the one or more boards. That is, the memory and the processor may be disposed individually on each board. Alternatively, a plurality of boards may share a same memory and a same processor. In addition, a necessary circuit may further be disposed on each board.

It should be understood that, the processor in embodiments of this application may be a central processing unit (CPU), or may be another general-purpose processor, a digital signal processor (DSP), an application-specific integrated circuit (ASIC), a field programmable gate array (FPGA), or another programmable logic device, a discrete gate or a transistor logic device, a discrete hardware component, or the like. The general-purpose processor may be a microprocessor or the processor may be any conventional processor or the like.

It can be further understood that the memory in embodiments of this application may be a volatile memory or a nonvolatile memory, or may include the volatile memory and the nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct Rambus dynamic random access memory (direct Rambus RAM, DR RAM).

According to the method provided in embodiments of this application, this application further provides a computer program product, where the computer program product includes computer program code, and when the computer program code is run on a computer, the computer is enabled to perform the method in any one of the embodiments shown in FIG. 5, FIG. 6, and FIG. 8.

According to the method provided in embodiments of this application, this application further provides a computer-readable medium, where the computer-readable medium stores program code, and when the program code is run on a computer, the computer is enabled to perform the method in any one of the embodiments shown in FIG. 5, FIG. 6, and FIG. 8.

According to the method provided in embodiments of this application, this application further provides a system, including the foregoing one or more terminal devices, one or more access network devices, and one or more core network devices.

All or some of the foregoing embodiments may be implemented by using software, hardware, firmware, or any combination thereof. When the software is used to implement the embodiments, all or some of the foregoing embodiments may be implemented in a form of a computer program product. The computer program product includes one or more computer instructions or computer programs. When the computer instructions or the computer programs are loaded or executed on a computer, the procedures or functions according to embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

For ease of understanding, the following describes terms used in a process of describing the solutions in this application.

In embodiments of this application, the "indication" may include a direct indication and an indirect indication, or may include an explicit indication and an implicit indication. Information indicated by using a piece of information (for example, the indication information described above) is referred to as to-be-indicated information. In a specific implementation process, the to-be-indicated information is indicated in a plurality of manners, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or agreed on in advance. For example, specific information may alternatively be indicated by using an arrangement sequence of all information that is agreed on in advance (for example, stipulated in a protocol), to reduce indication overheads to some extent.

In embodiments of this application, terms, English acronyms, the public network (PLMN), the non-stand-alone non-public network (CAG), the stand-alone non-public network (SNPN), radio resource control (RRC), access and mobility management function (AMF), and the like are all examples provided for ease of description, and shall not constitute any limitation on this application. This application does not exclude a possibility of defining another term that can implement a same or similar function in an existing or a future protocol.

In embodiments of this application, "first", "second", and various numeric numbers are merely used for distinguishing for ease of description and are not intended to limit the scope of embodiments of this application. For example, they are used to distinguish between different indication information.

In embodiments of this application, the "communication protocol" may be a standard protocol in the communication field, for example, may include an LTE protocol, an NR protocol, and a related protocol applied to a future communication system. This is not limited in this application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In this application, "at least one" means one or more, and "a plurality of" means two or more. "At least one of the following items (pieces)" or a similar expression thereof refers to any combination of these items, including any combination of singular items (pieces) or plural items (pieces). For example, at least one item (piece) of a, b, or c may indicate: a, b, c, a-b, a-c, b-c, or a-b-c, where a, b, and c may be in a singular or plural form.

Sequence numbers of the foregoing processes do not mean execution sequences in embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief descriptions, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic, a mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device and the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A communication method, comprising:
    determining, by a terminal device, that a first subscriber identity needs to be deregistered from a first network, wherein the terminal device supports the first subscriber identity and a second subscriber identity, wherein the first subscriber identity and the second subscriber identity correspond to different subscriber identity module (SIM) cards; and
    sending, by the terminal device, a deregistration request message to an access network device by using the second subscriber identity, wherein the deregistration request message carries an identifier of the first subscriber identity, and the deregistration request message is used to request to deregister the first subscriber identity from the first network.

2. The method according to claim 1, wherein the access network device belongs to the first network, or the access network device belongs to a third network, and mobility is supported between the third network and the first network.

3. The method according to claim 1, wherein the deregistration request message further carries an identifier of the second subscriber identity, and the deregistration request message is further used to request to deregister the second subscriber identity.

4. The method according to claim 1, wherein the method further comprises:
    receiving, by the terminal device by using the second subscriber identity, a deregistration accept message sent by the access network device, wherein the deregistration accept message carries the identifier of the first subscriber identity.

5. The method according to claim 1, wherein the determining, by the terminal device, that the first subscriber identity needs to be deregistered from the first network comprises:
    determining, by the terminal device, that the first subscriber identity camping on the first network needs to enter a second network through network selection.

6. A communication apparatus, comprising:
    at least one processor; and
    a memory coupled to the at least one processor, the memory comprising programming instructions that, when executed by the at least one processor, cause the communication apparatus to:
    determine that a first subscriber identity needs to be deregistered from a first network, wherein the communication apparatus supports the first subscriber identity and a second subscriber identity, wherein the first subscriber identity and the second subscriber identity correspond to different subscriber identity module (SIM) cards; and
    send a deregistration request message to an access network device by using the second subscriber identity, wherein the deregistration request message carries an identifier of the first subscriber identity, and the deregistration request message is used to request to deregister the first subscriber identity from the first network.

7. The communication apparatus according to claim 6, wherein the access network device belongs to the first network, or the access network device belongs to a third network, and mobility is supported between the third network and the first network.

8. The communication apparatus according to claim 6, wherein the deregistration request message further carries an identifier of the second subscriber identity, and the deregistration request message is further used to request to deregister the second subscriber identity.

9. The communication apparatus according to claim 6, wherein the programming instructions, when executed by the at least one processor, cause the communication apparatus to:
    receive, by using the second subscriber identity, a deregistration accept message sent by the access network device, wherein the deregistration accept message carries the identifier of the first subscriber identity.

10. The communication apparatus according to claim 6, wherein the programming instructions, when executed by the at least one processor, cause the communication apparatus to:

determine that the first subscriber identity that camps on the first network needs to enter a second network through network selection.

11. A communication apparatus, comprising:
at least one processor; and
a memory coupled to the at least one processor, the memory comprising programming instructions that, when executed by the at least one processor, cause the communication apparatus to:
receive a deregistration request message sent by a terminal device by using a second subscriber identity, wherein the deregistration request message carries an identifier of a first subscriber identity, and the deregistration request message is used to request to deregister the first subscriber identity from a first network, wherein the first subscriber identity and the second subscriber identity correspond to different subscriber identity module (SIM) cards; and
send the deregistration request message to a core network device.

12. The communication apparatus according to claim 11, wherein the communication apparatus belongs to the first network, or the communication apparatus belongs to a third network, and mobility is supported between the third network and the first network.

13. The communication apparatus according to claim 11, wherein the deregistration request message further carries an identifier of the second subscriber identity, and the deregistration request message is further used to request to deregister the second subscriber identity.

14. The communication apparatus according to claim 11, wherein the programming instructions, when executed by the at least one processor, cause the communication apparatus to:
send a deregistration accept message to the terminal device by using the second subscriber identity, wherein the deregistration accept message carries the identifier of the first subscriber identity.

* * * * *